United States Patent
Yasuno et al.

(10) Patent No.: US 12,265,026 B2
(45) Date of Patent: Apr. 1, 2025

(54) OPTICAL COHERENCE TOMOGRAPHY DEVICE, OPTICAL COHERENCE TOMOGRAPHY METHOD, AND NON-TRANSITORY COMPUTER READABLE MEDIUM STORINGIN STRUCTIONS THEREFORE

(71) Applicant: University of Tsukuba, Tsukuba (JP)

(72) Inventors: Yoshiaki Yasuno, Tsukuba (JP); Daisuke Oida, Tsukuba (JP); Kensuke Oikawa, Tsukuba (JP)

(73) Assignee: University of Tsukuba, Tsukuba (JP)

( * ) Notice: Subject to any disclaimer, the term of this patent is extended or adjusted under 35 U.S.C. 154(b) by 296 days.

(21) Appl. No.: 17/776,178

(22) PCT Filed: Nov. 13, 2020

(86) PCT No.: PCT/JP2020/042459
§ 371 (c)(1),
(2) Date: May 11, 2022

(87) PCT Pub. No.: WO2021/095852
PCT Pub. Date: May 20, 2021

(65) Prior Publication Data
US 2022/0390368 A1   Dec. 8, 2022

(30) Foreign Application Priority Data

Nov. 14, 2019   (JP) .............................. 2019-206506

(51) Int. Cl.
*G01N 21/45*   (2006.01)
*G01B 9/02091*   (2022.01)

(52) U.S. Cl.
CPC ....... *G01N 21/455* (2013.01); *G01B 9/02091* (2013.01)

(58) Field of Classification Search
CPC .......................... G01N 21/455; G01B 9/02091
(Continued)

(56) References Cited

U.S. PATENT DOCUMENTS

| | | | |
|---|---|---|---|
| 8,527,242 B2* | 9/2013 | Granot ................. | G01N 21/359 702/189 |
| 2008/0025570 A1* | 1/2008 | Fingler .............. | G01N 21/4795 382/107 |

(Continued)

FOREIGN PATENT DOCUMENTS

| | | | |
|---|---|---|---|
| JP | 2002-504671 A | 2/2002 | |
| JP | 2013-140077 A | 7/2013 | |

(Continued)

OTHER PUBLICATIONS

Fingler et al., Volumetric microvascular imaging of human retina using optical coherence tomography with a novel motion contrast technique. Opt Express. Nov. 23, 2009;17(24):22190-200.

(Continued)

*Primary Examiner* — Ricky Go
(74) *Attorney, Agent, or Firm* — McCarter & English, LLP

(57) ABSTRACT

A phase gradient calculation unit calculates a phase gradient on a plane intersecting an irradiation direction of light corresponding to an optical coherence tomography signal indicating a state of a sample for each of sample points arranged on the plane. A bulk phase error calculation unit integrates, for each of plurality of paths from an origin that is a sample point where a bulk phase error is determined to a destination that is a sample point where the bulk phase error is not determined, the phase gradient for each of the sample points along each of the plurality of corresponding paths to calculate a path specific phase error at the destination, and combines the path specific phase errors among the (Continued)

plurality of corresponding paths to determine the bulk phase error at the destination.

10 Claims, 17 Drawing Sheets

(58) Field of Classification Search
USPC .......................................................... 702/189
See application file for complete search history.

(56) References Cited

U.S. PATENT DOCUMENTS

| | | | |
|---|---|---|---|
| 2014/0221827 A1* | 8/2014 | Motaghiannezam | A61B 5/1128 356/479 |
| 2014/0375792 A1 | 12/2014 | Yaqoob et al. | |
| 2015/0009507 A1 | 1/2015 | Yasuno et al. | |
| 2016/0307314 A1* | 10/2016 | Reisman | G06T 7/0012 |

FOREIGN PATENT DOCUMENTS

| | | |
|---|---|---|
| JP | 2016-504947 A | 2/2016 |
| WO | 1999/42787 A1 | 8/1999 |
| WO | 2014/118325 A1 | 8/2014 |

OTHER PUBLICATIONS

Oikawa et al., Bulk-phase-error correction for phase-sensitive signal processing of optical coherence tomography. Biomed Opt Express. Sep. 25, 2020;11(10):5886-5902.

Shemonski et al., Three-dimensional motion correction using speckle and phase for in vivo computed optical interferometric tomography. Biomed Opt Express. Nov. 4, 2014;5(12):4131-43.

Spahr et al., Interferometric detection of 3D motion using computational subapertures in optical coherence tomography. Opt Express. Jul. 23, 2018;26(15):18803-18816.

Yasuno et al., Non-iterative numerical method for laterally super-resolving Fourier domain optical coherence tomography. Opt Express. Feb. 6, 2006;14(3):1006-20.

International Search Report and Written Opinion for Application No. PCT/JP2020/042459, dated Jan. 19, 2021, 6 pages.

* cited by examiner

OPTICAL COHERENCE TOMOGRAPHY DEVICE, OPTICAL COHERENCE TOMOGRAPHY METHOD, AND NON-TRANSITORY COMPUTER READABLE MEDIUM STORINGIN STRUCTIONS THEREFORE

CROSS-REFERENCE TO RELATED APPLICATIONS

This application is a 35 U.S.C. § 371 national stage filing of International Application No. PCT/JP2020/042459, filed on Nov. 13, 2020, which claims priority to Japanese Patent Application No. 2019-206506, filed on Nov. 14, 2019. The entire contents of each of the aforementioned applications are incorporated herein by reference.

TECHNICAL FIELD

The present invention relates to a signal processing device, a signal processing method, and a signal processing program.

BACKGROUND

Optical coherence tomography (OCT) is a technique for acquiring a tomographic image of a sample (which is living body in most cases), by means of optical coherency. With the OCT, an image showing not only the surface of the sample but also the internal structure of the same with high spatial resolution can be acquired. Advancement of the OCT technique has enabled an image with a higher resolution to be captured at a higher speed, and there has been an attempt to further sophisticate such a function. For example, Non-Patent Literature 1 describes digital defocus for Fourier domain-OCT (FD-OCT).

Typically, in an image obtained by the OCT, bulk phase error (BPE) occurs due to movement of the sample during the measurement and environmental fluctuation such as the atmosphere in which light travels, temperature, or the like. The bulk phase error indicates a variation in phase among a plurality of times of signal acquisitions (A-scan) in a depth direction. Thus, the bulk phase error may be one of factors hindering the sophistication of the function. The technique described in Non-Patent Literature 1 is nothing more than an approximative technique using a single tomographic image (B-scan) with measurement time short enough for the bulk phase error to be ignorable. Non-Patent Literature 2 describes a technique of performing digital refocusing, with a phase correction based on phase-contrast method on a three-dimensional OCT image (three-dimensional OCT volume). The phase-contrast method is a technique of calculating differential phase fields in two directions ((x, y) direction) in a front face of the three-dimensional OCT volume and performing cumulative summation of the differential phase fields to estimate the bulk phase error.

Non-Patent Literature 1: Yasuno et al., "Non-iterative numerical method for laterally superresolving Fourier domain optical coherence tomography," OPTICS EXPRESS Vol. 14, No. 3, p. 1006 to 1020, Feb. 6, 2006 Non-Patent Literature 2: Shemonski et al., "Three-dimensional motion correction using speckle and phase for in vivo computed optical interferometric tomography," BIOMEDICAL OPTICS EXPRESS Vol. 5, No. 12, p. 4131 to 4143, Dec. 1, 2014.

SUMMARY OF INVENTION

Unfortunately, the phase-contrast method involves cumulative summation of errors during the process of integrating the differential phase field, and thus the accuracy of the finally estimated bulk phase error tends to be low. Non-Patent Literature 2 describes smoothing processing performed on the estimated bulk phase error, as an attempt to reduce the error. This technique has no profound logical basis regarding the error reduction, and thus have even resulted in compromised estimation accuracy or a failure to estimate the bulk phase error in some cases.

The present invention has been made in view of the above, and an object of the present invention is to provide a signal processing device, a signal processing method, and a signal processing program with which bulk phase error estimation accuracy can be improved.

(1) The present invention has been made to solve the problem described above, and one aspect of the present invention is a signal processing device including a phase gradient on a plane intersecting an irradiation direction of light corresponding to an optical coherence tomography signal indicating a state of a sample for each of sample points arranged on the plane; and a bulk phase error calculation unit configured to integrate, for each of plurality of paths from an origin that is a sample point where a bulk phase error is determined to a destination that is a sample point where the bulk phase error is not determined, the phase gradient for each of the sample points along each of the plurality of corresponding paths to calculate a path specific phase error at the destination, and combine the path specific phase errors among the plurality of corresponding paths to determine the bulk phase error at the destination.

(2) Another aspect of the present invention is the signal processing device according to (1), in which the bulk phase error calculation unit may calculate, as the bulk phase error, an average of the path specific phase errors among the plurality of corresponding paths.

(3) Another aspect of the present invention is the signal processing device according to (2), in which the bulk phase error calculation unit may calculate, as the average, a weighted average of the path specific phase errors using a weighting factor based on a path length of each of the plurality of corresponding paths.

(4) Another aspect of the present invention is the signal processing device according to any one of (1) to (3), in which each of the plurality of corresponding paths may be confined within a predetermined range from the destination.

(5) Another aspect of the present invention is the signal processing device according to any one of (1) to (4), in which each of the plurality of corresponding paths may comprise an n-th link that is a section from an n-th sample point to an (n+1)-th sample point (n is an integer that is equal to or larger than 1 and is equal to or smaller than N−1, and N is an integer that is equal to or larger than 2), and the (n+1)-th sample point may be a sample point within a range, from the n-th sample point, not exceeding a spatial resolution of an optical system that acquires the optical coherence tomography signal.

(6) Another aspect of the present invention is the signal processing device according to any one of (1) to (5), in which a plurality of path patterns indicating the plurality of paths in association with positional relationship between the origin and the destination may be predetermined, and a plurality of paths indicated by path patterns among the plurality of path patterns satisfying the positional relationship with a target sample point, which is a calculation target of the bulk phase error, as the destination, may be selected.

(7) Another aspect of the present invention is the signal processing device according to (6), in which in the bulk phase error calculation unit, using one sample point on the plane as a reference point, an order of a calculation for the bulk phase error is preset with a higher weight for the calculation on a sample point closer to the reference point, and for the target sample point in an m-th order (m is an integer that is equal to or larger than 1), the plurality of paths indicated by path patterns among the plurality of path patterns satisfying the positional relationship with a sample point in an (m−1)-th order as the origin may be selected.

(8) Another aspect of the present invention is the signal processing device according to any one of (1) to (7) that may further include a signal correction unit that subtracts the bulk phase error at the destination from a phase of a signal value of the optical coherence tomography signal at a sample point, which is arranged in a three-dimensional space where a position projected on the plane is common to the destination.

(9) Another aspect of the present invention is a signal processing method in a signal processing device and includes calculating a phase gradient on a plane intersecting an irradiation direction of light corresponding to an optical coherence tomography signal indicating a state of a sample for each of sample points arranged on the plane; and integrating, for each of plurality of paths from an origin that is a sample point where a bulk phase error is determined to a destination that is a sample point where the bulk phase error is not determined, the phase gradient for each of the corresponding sample points along each of the plurality of paths to calculate a path specific phase error at the destination, and combining the path specific phase errors among the plurality of corresponding paths to determine the bulk phase error at the destination.

(10) Another aspect of the present invention is a signal processing program causing execution of calculating a phase gradient on a plane intersecting an irradiation direction of light corresponding to an optical coherence tomography signal indicating a state of a sample for each of sample points arranged on the plane; and integrating, for each of plurality of paths from an origin that is a sample point where a bulk phase error is determined to a destination that is a sample point where the bulk phase error is not determined, the phase gradient for each of the sample points along each of the plurality of corresponding paths a path specific phase error at the destination, and combining the path specific phase errors among the plurality of corresponding paths to determine the bulk phase error at the destination.

With the present invention, the bulk phase error estimation accuracy can be improved.

DESCRIPTION OF EMBODIMENTS

Figure 1:
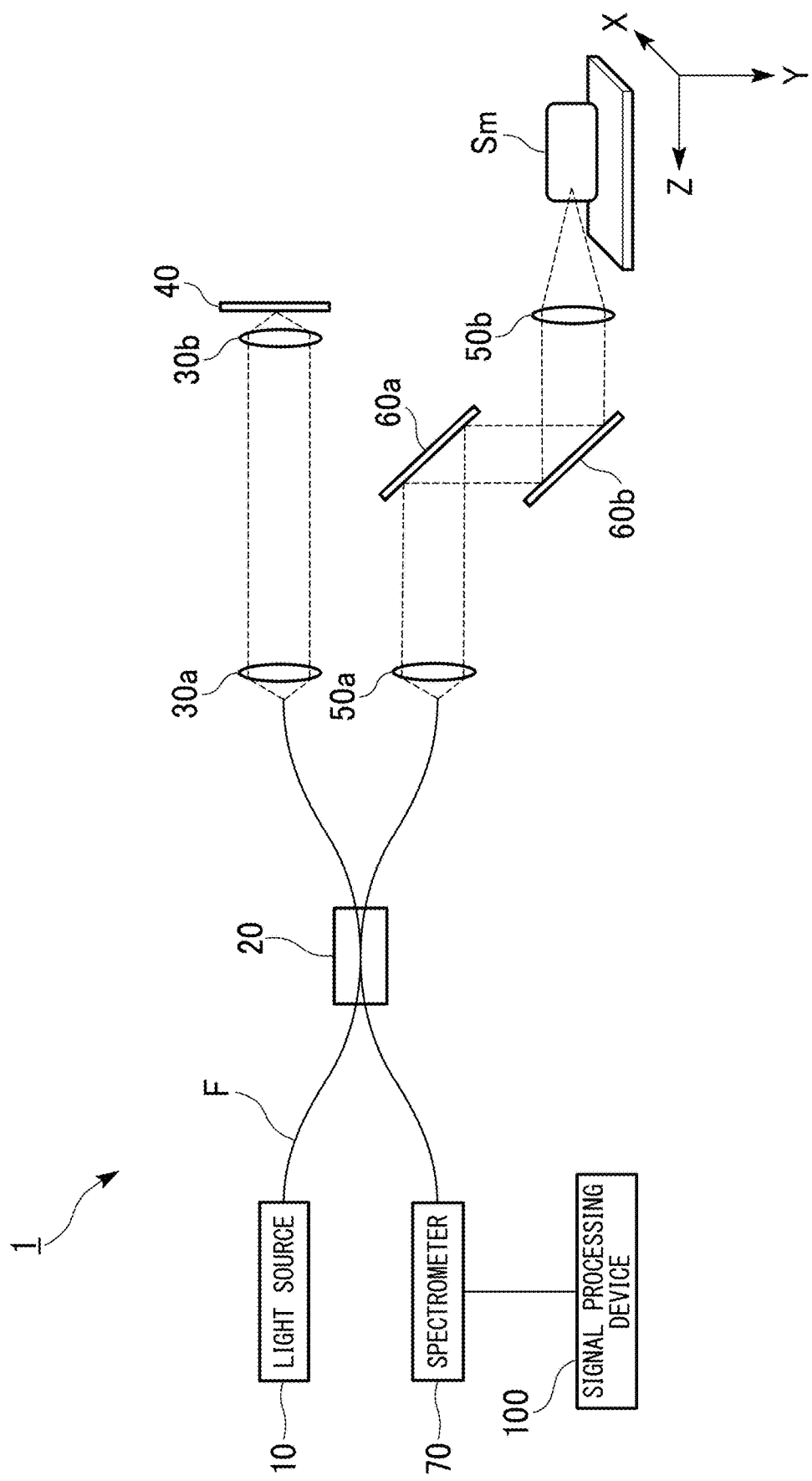
FIG. 1 is a configuration diagram illustrating an example of an optical coherence tomography system according to the present embodiment.

Embodiment of the present invention will be described below with reference to the drawings. FIG. 1 is a configuration diagram illustrating an example of an optical coherence tomography system 1 according to the present embodiment. The optical coherence tomography system 1 forms an observation system for observing a state of a sample using OCT. The optical coherence tomography system 1 is a device that irradiates a sample Sm with light, causes reflected light reflected from the sample Sm to interfere with reference light reflected by a reference mirror 40 (described below) to acquire interfering light, and generates an image indicating the states of the surface and interior of the sample Sm based on the interfering light acquired. An observation target object to be the sample Sm may be any of human or animal living body and a non-living material for example. The living body may be fundus, blood vessels, teeth, subcutaneous tissue, or the like. The non-living material may be any of an artificial structure such as an electronic parts or machine parts, a natural structure such as stones or minerals, and a material without any particular shape.

The optical coherence tomography system 1 includes a light source 10, a beam splitter 20, a collimators 30a, 30b, 50a, and 50b, the reference mirror 40, galvanometric mirrors 60a and 60b, a spectrometer 70, and a signal processing device 100. Of these components, the beam splitter 20, the collimators 30a, 30b, 50a, and 50b, the reference mirror 40, the galvanometric mirrors 60a and 60b, and the spectrometer 70 form an optical system known as an interferometer. The interferometer illustrated in FIG. 1 is a Michelson interferometer with optical fibers F. More specifically, the light source 10, the spectrometer 70, the collimator 30a, and the collimator 50a are each connected to the beam splitter using the optical fibers F. The transmission band of the optical fiber F includes a wavelength band of the light emitted from the light source 10.

For example, the optical coherence tomography system 1 is a Fourier-domain OCT (FD-OCT). The FD-OCT may be, for example, any of a spectral-domain OCT (SD-OCT), a swept-source OCT, and the like, but is not limited to these. For example, the optical coherence tomography system 1 may be time-domain OCT (TD-OCT). When the optical coherence tomography system 1 is the TD-OCT, the position of the reference mirror 40 is not fixed, and a drive mechanism enabling an optical path from the light source 10 to the reference mirror 40 to be changed is provided.

The light source 10 emits, for example, probe light with a near-infrared wavelength (800 to 1000 nm for example). For example, the light source 10 is a wavelength swept light source such as an ultra-short wave pulse laser or a superluminescent diode (SLD). The light emitted from the light source 10 is guided in the optical fiber F to enter the beam splitter 20.

The beam splitter 20 splits the entered light into light (hereinafter, reference light) guided to the collimator 30a, and light (hereinafter, probe light) guided to the collimator 50a. The beam splitter 20 is, for example, a cube beam splitter or the like.

The collimator 30a changes the reference light guided from the beam splitter 20 into collimated light and emits the collimated light to the collimator 30b. The collimator 30b focuses the collimated light incident from the collimator 30a and emits the focused reference light to the reference mirror 40. The collimator 30b receives the reference light reflected by the reference mirror 40, changes the reference light into collimated light, and emits the collimated light to the collimator 30a. The collimator 30a focuses the collimated light incident from the collimator 30b and guides the resultant light to the beam splitter 20.

On the other hand, the collimator 50a changes the probe light guided from the beam splitter 20 into collimated light and emits the collimated light to the galvanometric mirror 60a. The collimated light, from the collimator 50a, incident on the surfaces of the galvanometric mirrors 60a and 60b is reflected by each surface to be emitted to the collimator 50b. The collimator 50b focuses the collimated light incident thereon via the galvanometric mirrors 60a and 60b from the collimator 50a and irradiates the focused probe light to the sample Sm. The probe light irradiated to the sample Sm is reflected on a reflection surface of the sample Sm to be incident on the collimator 50b. The reflection surface is not limited to a boundary surface between the sample Sm and the surrounding environment (atmosphere for example) of the sample Sm, and may be a boundary surface between materials or tissues, in the sample Sm, with different refractive indices. The light reflected on the reflection surface of the sample Sm to be incident on the collimator 50b is hereinafter referred to as reflected light.

The collimator 50b emits the reflected light incident thereon, to the galvanometric mirror 60b. The reflected light is reflected on the surface of each of the galvanometric mirrors 60b and 60a to be emitted to the collimator 50a. The collimator 50a focuses the collimated light incident thereon from the collimator 50a via the galvanometric mirrors 60a and 60b and guides the focused reflected light to the beam splitter 20. The beam splitter 20 guides the reference light reflected by the reference mirror 40 and the reflected light reflected by the sample Sm to the spectrometer 70 through the optical fibers F.

The spectrometer 70 includes a diffraction grating and a light receiving element therein. The reference light and the reflected light guided from the beam splitter 20 are separated by the diffraction grating. The separated reference light and reflected light interfere with each other, to be interfering light that is interfered. The light receiving element detects the interfering light and generates a signal (hereinafter, a detection signal) based on the interfering light detected. The light receiving element includes a plurality of pixels two-dimensionally arranged on a predetermined imaging plane. The light receiving element outputs the generated detection signal to the signal processing device 100.

The signal processing device 100 acquires an OCT signal indicating the state of the sample Sm, based on the detection signal input from the spectrometer 70. The signal processing device 100 generates the OCT signal within a predetermined region, by sequentially performing cumulative summation of the detection signals of the corresponding observation points acquired from the respective observation points or collectively acquired for each of the plurality of observation points forming a predetermined unit, while sequentially switching between observation points in a predetermined order. The signal processing device 100 converts a corrected signal value of each sample point into a luminance value of each pixel and generates image data indicating the luminance values of the pixels each corresponding to an individual sample point In the present embodiment, the signal processing device 100 performs the following processing on the acquired OCT signal, before the image data is generated. The signal processing device 100 calculates a phase gradient of the OCT signal for each of the sample points arranged on a predetermined plane. The signal processing device 100 defines, as an origin, a sample point at which the bulk phase error has been determined, defines, as a destination, a sample point at which the bulk phase error has not been determined, and sets a plurality of paths from the origin to a certain one destination. Then, the signal processing device 100 integrates the phase gradients at the corresponding sample points from the origin to the destination along each of the paths, to calculate the bulk phase error (hereinafter, path specific phase error) for each of the paths. The signal processing device 100 combines the path specific phase errors of the corresponding paths, to determine the bulk phase error at the destination. The signal processing device 100 performs the processing of determining the bulk phase error for each of the sample points to be the destination on the plane. The bulk phase error means an error that is included in the phase of the OCT signal due to the movement of the sample, fluctuation in the atmosphere in which the light travels and fluctuation of temperature. The signal processing device 100 subtracts the bulk phase error from the phase of the signal value at each sample point indicating the OCT signal, to correct the phase of the signal value.

Figure 2:
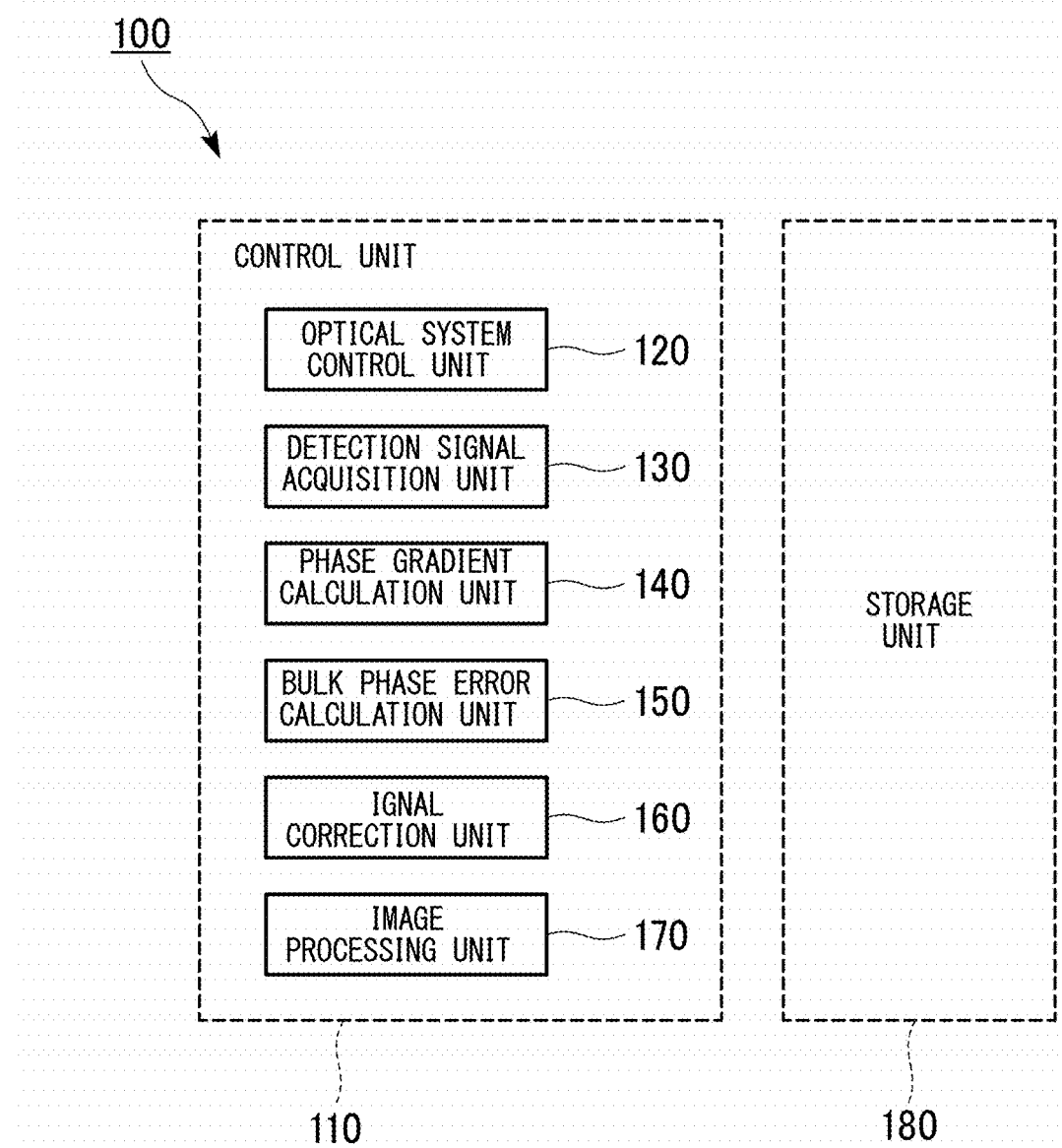
FIG. 2 is a block diagram illustrating an example of a functional configuration of a signal processing device according to the present embodiment.

Next, an example of a functional configuration of the signal processing device 100 according to the present embodiment will be described. FIG. 2 is a block diagram illustrating an example of a functional configuration of the signal processing device 100 according to the present embodiment. The signal processing device 100 includes a control unit 110 and a storage unit 180. For example, the function of the control unit 110 is executed when a processor such as a central processing unit (CPU) reads a program stored in the storage unit 180 in advance and executes processing as instructed by an instruction described in the read program. In the present application, execution of the processing as instructed by the instruction described in the program may be referred to as executing the program, execution of the program, and the like. The control unit 110 may be partially or entirely formed by hardware such as a large scale integration (LSI) or an application specific integrated circuit (ASIC), or dedicated hardware.

The control unit 110 includes an optical system control unit 120, a detection signal acquisition unit 130, a phase gradient calculation unit 140, a bulk phase error calculation unit 150, a signal correction unit 160, and an image processing unit 170.

The optical system control unit 120 drives a drive mechanism enabling a change in the positions of the galvanometric mirrors 60a and 60b, to scan the sample points that are the observation points of the sample Sm. The scanning of the sample points of the sample Sm is performed in each of a depth direction of the sample Sm and a direction (a vertical direction for example) intersecting a direction intersecting the depth direction. In the following description, the depth direction of the sample may be referred to as a z direction in a three-dimensional orthogonal coordinate system, and a first direction and a second direction orthogonal to the z direction and to each other may be respectively referred to as an x direction and a y direction. The signal acquisition in the depth direction of a sample may be referred to as A-scan, whereas the signal acquisition in a direction (the x direction or the y direction for example) intersecting the depth direction may be referred to as B-scan.

The detection signal acquisition unit 130 sequentially acquires the detection signals from the spectrometer 70. Based on the detection signal acquired, the detection signal acquisition unit 130 calculates, for each of the sample points arranged at a predetermined interval in the three-dimensional space including the sample Sm, a distribution of light (reflected light), as a signal value, in which the probe light in the depth direction of the sample Sm is reflected. The depth direction of the sample Sm corresponds to the incident direction (z direction) of the probe light. The refractive index distribution that is calculated corresponds to the intensity distribution of the reflected light. The detection signal acquisition unit 130 repeats processing for calculating the intensity distribution of the reflected light for each of the observation points to be switched through signal acquisition along a plane (for example, an x-y plane) intersecting the z direction. Thus, the detection signal acquisition unit 130 can acquire data (hereinafter, OCT signal) indicating the distribution of reflected light in a three-dimensional region that can be observed (hereinafter, observable region). The OCT signal indicates a signal value at each of the sample points distributed at a regular interval in the observable region. The OCT signal is three-dimensional data indicating the state of the sample Sm in the observable region and is also referred to as an OCT volume, a three-dimensional OCT signal (FIG. 3), and the like. The detection signal acquisition unit 130 stores the acquired OCT signal in the storage unit 180. The plane intersecting the z direction may not necessarily be orthogonal to the z direction, and is in any direction not parallel to the z direction. In the two-dimensional plane intersecting the z direction, each of the sample points may not necessarily have to be arranged at a grid point of an orthogonal grid. The sample points may each be arranged on a grid point of a diagonal grid or may be aperiodically arranged for example. Note that the interval between adjacent sample points does not exceed the spatial resolution of the optical system. In other words, there will be no significant difference in phase component due to the structure of a sample (sample phase), between adjacent sample points. As described below, by calculating a phase difference in the signal value between the adjacent sample points as an element of the phase gradient, the sample phase component is offset, and the bulk phase error component remains. While the signal acquisition involving switching of target sample point or the collective signal acquisition on a plurality of sample points is referred to as "scan" in the above description, the signal acquisition may not necessarily involve scanning through driving of a member (for example, the collimator 50b and a support for the sample Sm) of the optical system or a detector. In such a case, the function for the signal acquisition is provided to the detection signal acquisition unit 130 and is omitted in the optical system control unit 120. For example, when A-scan is performed at one point on the x-y plane using FD-OCT as the OCT method, the detection signal acquisition unit 130 detects, as the detection signal, interfering light based on reflected light the frequency component of which differs depending on the depth of the sample Sm. The detection signal acquisition unit 130 can perform Fourier transform on the detection signal to calculate the conversion coefficient for each frequency and determine the conversion coefficient of the depth associated with the frequency as the signal value at that depth. When the scanning through driving in the x direction or the y direction is not required, the optical system control unit 120 may be omitted.

Figure 3:
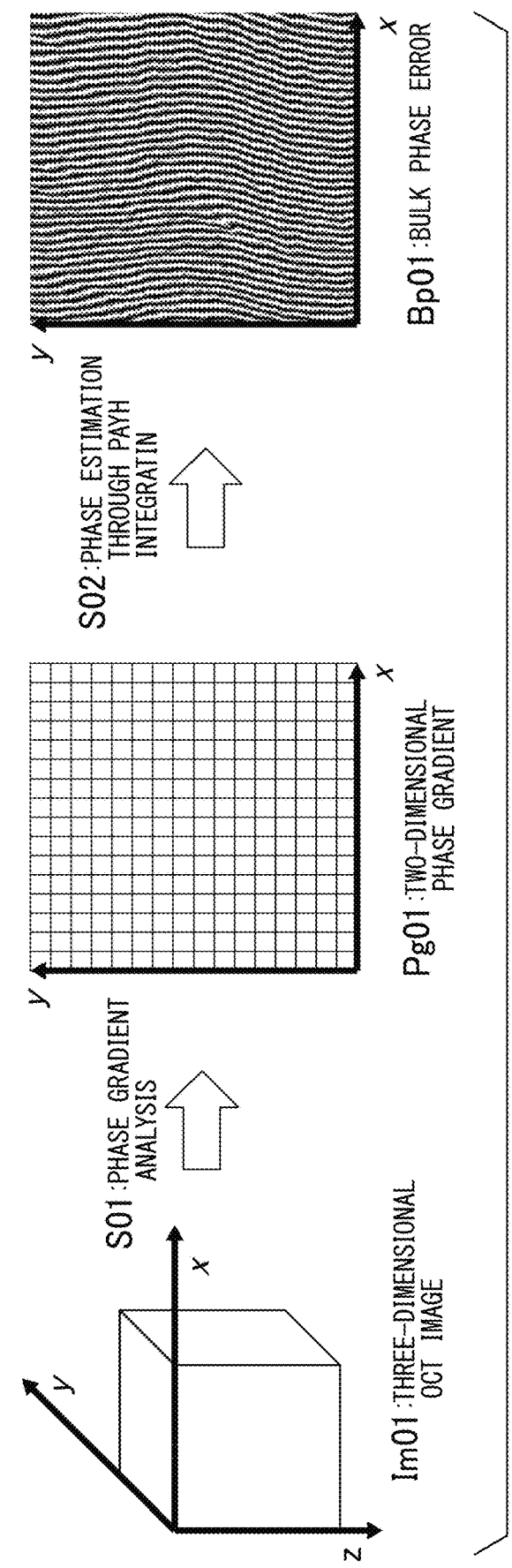
FIG. 3 is an explanatory diagram illustrating an overview of bulk phase error calculation processing according to the present embodiment.

The phase gradient calculation unit 140 reads the OCT signal from the storage unit 180, performs, using a known method, phase unwrapping on the signal value at each sample point indicated by the read OCT signal, and adjusts the phase of the signal value to calculate an unwrapped phase. The phase unwrapping is processing performed for a phase limited to a value range of $-\pi$ to $\pi$, to release the limitation to guarantee spatial continuity. The phase gradient calculation unit 140 calculates the phase gradient for each of the sample points arranged on a predetermined two-dimensional plane, based on the unwrapped phase of each sample point (FIG. 3, phase gradient analysis S01). The phase gradient is a two-dimensional vector including, as elements, partial differentiations respectively corresponding to the first direction (the x direction for example) and the second direction (the y direction for example) that are parallel to the two-dimensional plane and are orthogonal to each other. The two-dimensional plane may or may not be orthogonal to the z direction, as long as the two-dimensional plane intersects the z direction. The two-dimensional plane may be a plane crossing an observable region or a virtual plane, as long as the two-dimensional plane is a plane that can be projected from any point in the three-dimensional observable region. Regarding the two-dimensional plane, for example, the sample points arranged in the three-dimensional observable region are associated with points projected in a third direction (the z direction for example) orthogonal to the two-dimensional plane. The phase gradient is calculated for each sample point in the two-dimensional plane intersecting the z direction, because the bulk phase error mainly depends on coordinates in the two-dimensional plane and does not depend on the z direction. Note that in the following description, a region where sample points projected on a two-dimensional plane are distributed may be referred to as a two-dimensional region. The phase gradient calculation unit 140 stores, as phase gradient data (FIG. 3: two-dimensional phase gradient Pg01), data indicating the phase gradient calculated for each sample point in the two-dimensional region, in the storage unit 180.

The bulk phase error calculation unit 150 reads the phase gradient data from the storage unit 180, performs processing described below based on the phase gradient of each sample point indicated by the read phase gradient data, to calculate the bulk phase error at each of the sample points arranged in the two-dimensional region. The bulk phase error calculation unit 150 defines one sample point or each of the plurality of sample points, in which the bulk phase error has been determined, as an origination point and sets a plurality of paths from the origin to a destination that is one of the sample points in which the bulk phase errors have not been determined. For each of the paths, the bulk phase error calculation unit 150 integrates the phase gradients at the respective sample points along the corresponding paths (FIG. 3: path estimation through path integration S02) from the origin to the destination, to calculate the integrated value at the destination as the path specific phase error. Then, the bulk phase error calculation unit 150 combines path specific phase errors, which are calculated for each path, of the plurality of corresponding paths and determines a combined value thus calculated as the bulk phase error at the destination (FIG. 3: bulk phase error Bp01). It should be noted that the bulk phase error calculation unit 150 defines one of the sample points on the two-dimensional plane to be a reference point (the origin of the two-dimensional region) and determines in advance the bulk phase error at the reference point to be a predetermined reference value (0 for example). The bulk phase error calculation unit 150 stores, in the storage unit 180, the bulk phase error data indicating the bulk phase error at each of the determined sample points.

The signal correction unit 160 reads the bulk phase error data and the OCT signal from the storage unit 180. The signal correction unit 160 performs processing of correcting the phase of the signal value at each sample point indicated by the OCT signal, based on the bulk phase error at each sample point indicated by the read bulk phase error data. The signal correction unit 160 identifies, as a corresponding three-dimensional sample point, a sample point (hereinafter, three-dimensional sample point) in the observable region where the position projected on the two-dimensional plane is common to the position of a sample point (hereinafter, two-dimensional sample point) on the two-dimensional region indicated by the bulk phase error data. A plurality of three-dimensional sample points may be identified for a single two-dimensional sample point. The signal correction unit 160 corrects the phase of the signal value at the identified three-dimensional sample point by subtracting the bulk phase error at the corresponding two-dimensional sample point. The signal correction unit 160 may further performs known correction processing (such as refocusing and speckle suppression, for example) on the signal value having the phase corrected for each three-dimensional sample point. The signal correction unit 160 stores, in the storage unit 180, a corrected OCT signal indicating the signal value at each three-dimensional sample point, obtained by the correction processing.

The image processing unit 170 reads the corrected OCT signal from the storage unit 180 and converts the signal value at each three-dimensional sample point into a luminance value, by using a predetermined conversion function. The luminance value obtained by the conversion is within a range of values that can be expressed with a bit depth of each pixel. Image data is generated to include, as a luminance value of each pixel, the luminance value at each sample point on a two-dimensional plane that is the observation target (hereinafter, observation target plane). In the present application, a sample point may be referred to as a pixel.

The image processing unit 170 may determine, as the observation target two-dimensional plane, a cross section across at least part of the observable region, based on an operation signal input from an operation input unit (not illustrated). The operation signal indicates requirements for the observation target plane, such as, for example, the depth from the sample surface and the observation direction with respect to the sample surface. The operation input unit may include a member that receives an operation from a user and generates the operation signal in accordance with the operation received. Examples of such a member include a button, a knob, a dial, a mouse, a joystick, and the like. The operation input unit may be an input interface for receiving the operation signal from another device (a mobile device such as a remote controller for example) wirelessly or through a wire. The image processing unit 170 may output the generated image data to a display unit (not illustrated) and cause the display unit to display an OCT image based on the image data. The display unit may be, for example, any of a liquid crystal display (LCD), an organic electroluminescence display (OLED), and the like. The image processing unit 170 may store the generated image data in the storage unit 180 or may transmit the image data to another device wirelessly or through a wire using a communication unit (not illustrated).

In addition to the above-described program, the storage unit 180 stores various types of data used for processing performed by the control unit 110 and various types of data acquired by the control unit 110. The storage unit 180 includes a non-volatile (non-transitory) storage medium such as a read only memory (ROM), a flash memory, and a hard disk drive (HDD) for example. The storage unit 180 includes a volatile storage medium such as a random access memory (RAM) and a register, for example.

Phase Gradient

Next, an example of phase gradient calculation will be described. The phase gradient calculation unit 140 calculates a phase gradient (Bx, By) for each two-dimensional sample point (x, y) arranged in the two-dimensional region, based on an unwrapped phase φ(x, y, z) for each three-dimensional sample point (x, y, z). In the example illustrated in FIG. 3, the three-dimensional sample points (x, y, z) are distributed in a rectangular parallelepiped observable region, at a predetermined interval in each of the x direction, the y direction, and the z direction. The x direction, the y direction, and the z direction are equivalent to directions of the corresponding sides that are orthogonal to each other and define outer edges of the observable region. The two-dimensional region is the two-dimensional x-y plane parallel to the x direction and the y direction. The coordinates of the two-dimensional sample point (x, y) which is a three-dimensional sample point (x, y, z) projected on the two-dimensional region can be obtained by ignoring the z direction coordinate value in the three-dimensional sample point (x, y, z). In other words, the coordinates of the three-dimensional sample point (x, y, z) corresponding to the two-dimensional sample point (x, y) are a sample point expressed by an x coordinate value and a y coordinate value that are the same as an x coordinate value and a y coordinate value in the two-dimensional sample point (x, y).

For example, the phase gradient calculation unit 140 calculates, an x direction component of the phase gradient $B_x(x, y)$ in the corresponding two-dimensional sample point (x, y), an argument of the sum over the z direction in the observation region, of values obtained by multiplying a spectrum A(x, y, z) of the signal value at the three-dimensional sample point (x, y, z) and a complex conjugate A*(x+Δx, y, z) of a spectrum of the signal value at a three-dimensional sample point (x+Δx, y, z) adjacent to the three-dimensional sample point (x, y, z) in the x direction, as shown in Equation (1).

[Math. 1]

$$B_x(x, y) = \sum_z \arg\{A(x, y, z)A^*(x + \Delta x, y, z)\} \quad (1)$$

The phase gradient calculation unit 140 can also calculate a y direction component $B_y(x, y)$ of the phase gradient in the corresponding two-dimensional sample point (x, y), based on the spectrum A(x, y, z) of the signal value at the three-dimensional sample point (x, y, z) and a complex conjugate A*(x, y+Δy, z) of a spectrum of a signal value at a three-dimensional sample point (x, y+Δy, z) adjacent to the three-dimensional sample point (x, y, z) in the y direction, as shown in Equation (2).

[Math. 2]

$$B_y(x, y) = \sum_z \arg\{A(x, y, z)A^*(x + \Delta x, y, z)\} \quad (2)$$

In Equations (1) and (2), Δx and Δy indicate intervals between the three-dimensional sample points and two-dimensional sample points in the x and y directions, respectively. Furthermore, arg( . . . ) indicates the argument of a complex . . . . By obtaining the argument for the value obtained through multiplications among sample points distributed in the z direction orthogonal to the x-y plane, while cumulative summation of random sample phase residual errors does not occur between individual two-dimensional sample points, cumulative summation of the bulk phase errors occurs, as shown in Equations (1) and (2). Thus, an error due to the sample phase residual error can be reduced. Furthermore, the phase gradient is calculated with a sample point with higher intensity prioritized over a sample point with low intensity where the influence of noise is likely to be eminent, whereby the influence of noise is reduced. The phase gradient B calculated for each two-dimensional sample point is used for calculating the bulk phase error as described above.

As described below, the integration path is not necessarily limited to part parallel to the x direction or the y direction, and may include part extending in direction intersecting both the x direction and the y direction. In such a case, the phase gradient calculation unit 140 can calculate an adjacent sample point (x+Δx, y+Δy) and a phase gradient $B_{xy}(x, y)$ at a sample point (x, y) in the part, based on Equation (3).

[Math. 3]

$$B_{xy}(x, y) = \sum_z \arg\{A(x, y, z)A^*(x, y + \Delta x, y + \Delta y, z)\} \quad (3)$$

Path Integration

Next, an example of the path integration of the phase gradient will be described. In the bulk phase error calculation unit 150, for each two-dimensional sample point (hereinafter, also referred to as a phase determination target pixel) to be the target of phase error determination, a plurality of integration paths, the destination of which are the corresponding phase determination target pixels, are set in advance. The origin of each of the integration paths is a two-dimensional sample point for which the phase error has been determined (hereinafter, also referred to as phase determined pixel). Note that the origin is a two-dimensional sample point located within a predetermined range from the destination point. Under such a condition, the number of integration paths is limited and does not become excessively large.

For example, the bulk phase error calculation unit 150 calculates, as a path specific phase error $\varphi_{e, Pt}$, an integrated value at a destination obtained by performing path integration on the phase gradients B at respective sample points (x, y) on path Pt from each origination point Op to each destination Dp of the path Pt, as shown in Equation (4).

[Math. 4]

$$\phi_{e,Pt} = \int_{Pt} B(x, y)^\bullet n(x, y) dx dy \quad (4)$$

In Equation (4), B(x, y) represents the phase gradient, which is a two-dimensional vector including, as elements, an x direction component $B_x(x, y)$ and a y direction component $B_y(x, y)$ at a sample point (x, y). Note that n(x, y) represents a direction vector in a tangential direction of the path Pt.

More specifically, as the direction vector n(x, y), a vector with an origin being the sample point (x, y) and a destination being an adjacent sample point on the path Pt can be used. Furthermore, represents the inner product of the vector. Then, the bulk phase error calculation unit 150 combines the path specific phase errors $\varphi_{e, Pt}$, which are calculated for the paths Pt, of the corresponding paths having common destination Dp, to calculate a bulk phase error $\varphi_e$ at the destination Dp.

Figure 4:
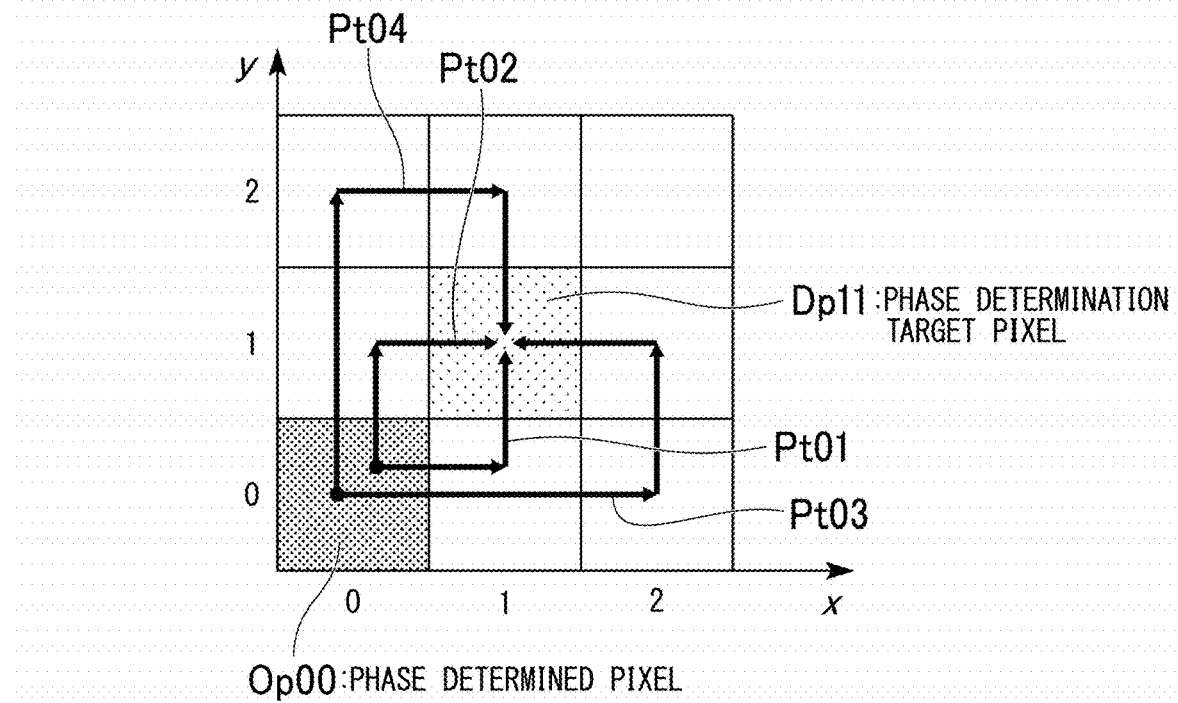
FIG. 4 is an explanatory diagram illustrating an example an integration path according to the present embodiment.

Next, an example of an integration path that is set on a two-dimensional plane will described. FIG. 4 is an explanatory diagram illustrating an example an integration path according to the present embodiment. In the example illustrated in FIG. 4, four paths Pt01 to Pt04 are set for a phase determined pixel Op00 that is the origin and a phase determination target pixel Dp11 that is the destination. The coordinates of the phase determined pixel Op00 and the coordinates of the phase determination target pixel Dp11 on the two-dimensional plane are (0,0) and (1,1), respectively. The destination is adjacent to the origin in a diagonal direction intersecting both the x coordinate and the y coordinate. The x coordinate and y coordinate are normalized, and thus intervals $\Delta x$ and $\Delta y$ can each be 1. The paths Pt01 to Pt04 are each formed by sequentially connecting links each having one sample point as the origin and a sample point adjacent thereto in the x direction or the y direction being the destination. A vector indicating each link is used as the direction vector in Equation (4) for calculating the path specific phase error. In this example, because the length of each link (hereinafter, link length) is 1, the bulk phase error calculation unit 150 can define the number of links forming each of the paths Pt01 to Pt04 as the length of the path (hereinafter, path length). The path lengths of the paths Pt01, Pt02, Pt03, and Pt04 are 2, 2, 4, and 4, respectively.

Thus, the bulk phase error calculation unit 150 can calculate path specific phase errors $\varphi_{e, Pt01}$, $\varphi_{e, Pt02}$, $\varphi_{e, Pt03}$, and $\varphi_{e, Pt04}$ related to the paths Pt01, Pt02, Pt03, and Pt04, respectively, for the phase determination target pixel Dp11, to be $B_x(0, 0)+B_y(1, 0)$, $B_y(0, 0)+B_x(0, 1)$, $B_x(0, 0)+B_x(1, 0)+B_y(2, 0)-B_x(2, 1)$, and $B_y(0, 0)+B_y(0, 1)+B_x(0, 2)-B_y(1, 2)$, respectively.

The bulk phase error calculation unit 150 calculates, for example, a simple average between paths, as the bulk phase error obtained by combining the path specific phase errors of the corresponding paths. In the example illustrated in FIG. 4, the process of calculating the bulk phase error includes normalization processing of dividing the sum of the path specific phase errors by 4 that is the number of paths. However, an influence of error superimposed on the phase gradient may differ depending on the path length. Thus, the bulk phase error calculation unit 150 may use a value depending on the path length as a weighting factor for each path and calculate a weighted average of the path specific phase errors as the bulk phase error. For example, the bulk phase error calculation unit 150 can use, as the weighting factor for each path, real numbers that are proportional to $a^p$ (where a is the real number larger than 0 and smaller than 1, and p is the path length), with the sum thereof between the paths normalized to 1. In such a case, in the example illustrated in FIG. 4, the weighting factors for the path specific phase errors $\varphi_{e, Pt01}$, $\varphi_{e, Pt02}$, $\varphi_{e, Pt03}$, and $\varphi_{e, Pt04}$ are $a^2/2(a^2+a^4)$, $a^2/2(a^2+a^4)$, $a^4/2(a^2+a^4)$, and $a^4/2(a^2+a^4)$, respectively. The bulk phase error calculation unit 150 may use, as the weighting factor for each path, values inversely proportional to the path length p, with the sum thereof between paths normalized to be 1. In such a case, in the example illustrated in FIG. 4, the weighting factors for the path specific phase errors $\varphi_{e, Pt01}$, $\varphi_{e, Pt02}$, $\varphi_{e, Pt03}$, and $\varphi_{e, Pt04}$ are ⅓, ⅓, ⅙, and ⅙, respectively. With such techniques, the contribution of the path specific phase error of a path with a long path length to the bulk phase error can be made small.

The bulk phase error calculation unit 150 may use Equation (5) to calculate a bulk phase error $\varphi_b^{(t)}(x_0, y_0)$ at a destination $(x_0, y_0)$. In Equation (5), $\varphi_{e, Pt}(x_0, y_0)$ represents a path specific phase error corresponding to the path Pt. According to Equation (5), a sum vector that has a magnitude of 1 and is a sum of unit vectors corresponding to paths with the path specific phase error being the argument is calculated, and the argument of the calculated sum vector is determined to be the bulk phase error $\varphi_b^{(t)}(x_0, y_0)$.

[Math. 5]

$$\phi_b^{(t)}(x_0, y_0) = \arg \sum_{Pt} \exp i\phi_{e,Pt}(x_0, y_0) \tag{5}$$

Various integration paths can be set in accordance with the positional relationship between the phase determined pixel and the phase determination target pixel. In the following description, a set of a plurality of integration paths corresponding the positional relationship between the phase determined pixel and the phase determination target pixel are referred to as a path pattern. An example of the path pattern illustrated in FIG. 4 is referred to as a path pattern Pn00.

FIG. 5A to FIG. 5I are diagrams illustrating other examples of the path pattern according to the present embodiment. Path patterns Pn01 to Pn09 respectively illustrated in FIG. 5A to FIG. 5I each have the phase determination target pixel Dp11 being the destination point, with a position of the phase determined pixel as the origin being adjacent to the phase determination target pixel Dp11 in one or both of the negative directions on the x axis and the y axis. The number of phase determined pixels that are the origins is not limited to one and may be two or more. The number of phase determined pixels that are the origins of the path patterns Pn00 to Pn02 is one. On the other hand, the number of phase determined pixels that are the origins of the path patterns Pn03 to Pn05 is two. The number of phase determined pixels that are the origins of the path patterns Pn06 to Pn09 is three.

Figure 5A:
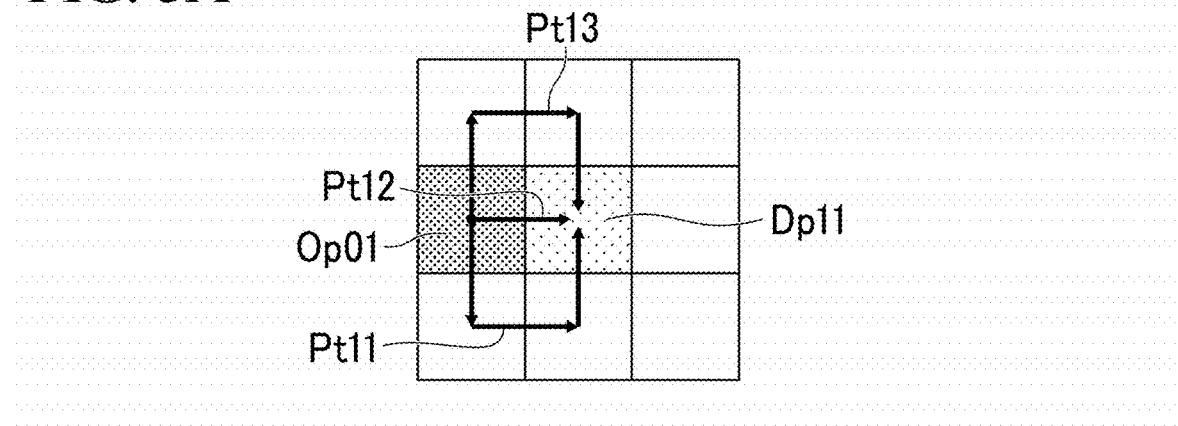
FIG. 5A is a diagram illustrating a first example of a path pattern according to the present embodiment.
Figure 5B:
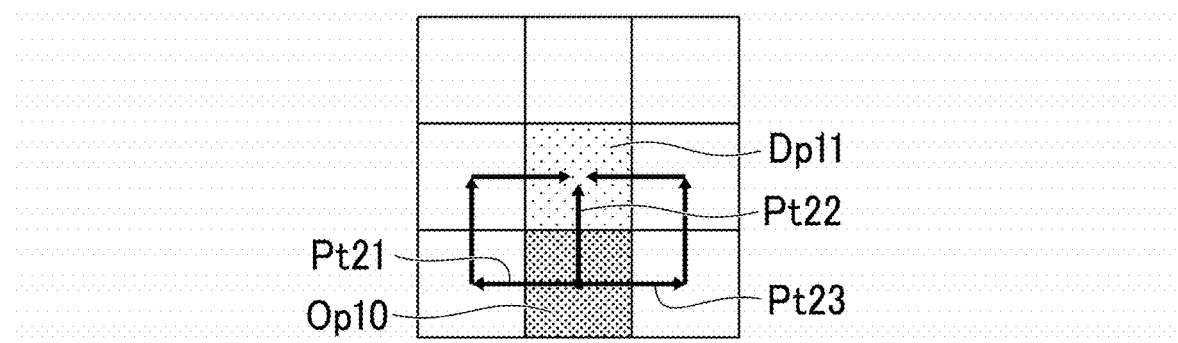
FIG. 5B is a diagram illustrating a second example of a path pattern according to the present embodiment.
Figure 5C:
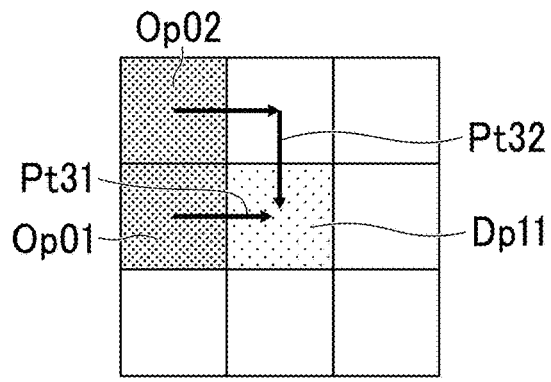
FIG. 5C is a diagram illustrating a third example of a path pattern according to the present embodiment.

The path pattern Pn01 illustrated as an example in FIG. 5A includes three paths Pt11 to Pt13. Each of the paths Pt11 to Pt13 has a phase determined pixel Op01 serving as the origin. The path lengths of the paths Pt11, Pt12, and Pt13 are 3, 1, and 3, respectively. The path pattern Pn02 illustrated as an example in FIG. 5B includes three paths Pt21 to Pt23. Each of the paths Pt21 to Pt23 has a phase determined pixel Op10 serving as the origin. The path lengths of the paths Pt21, Pt22, and Pt23 are 3, 1, and 3, respectively. The path pattern Pn03 illustrated as an example in FIG. 5C includes two paths Pt31 and Pt32. The paths Pt31 and Pt32 respectively have the phase determined pixel Op01 and a phase determined pixel Op02 serving as the origins. The path lengths of the paths Pt31 and Pt32 are 1 and 3, respectively.

Figure 5D:
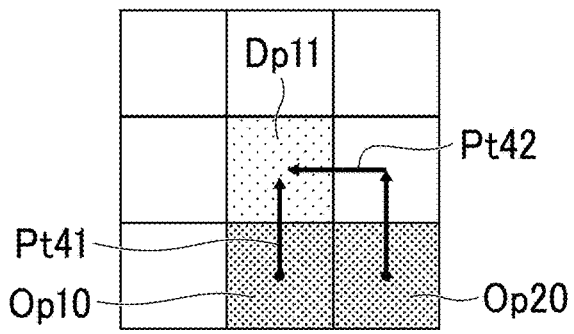
FIG. 5D is a diagram illustrating a fourth example of a path pattern according to the present embodiment.

The path pattern Pn04 illustrated as an example in FIG. 5D includes two paths Pt41 and Pt42. The paths Pt41 and Pt42 respectively have the phase determined pixels Op10 and Op20 serving as the origins. The path lengths of the paths Pt41 and Pt42 are 1 and 3, respectively.

Figure 5E:
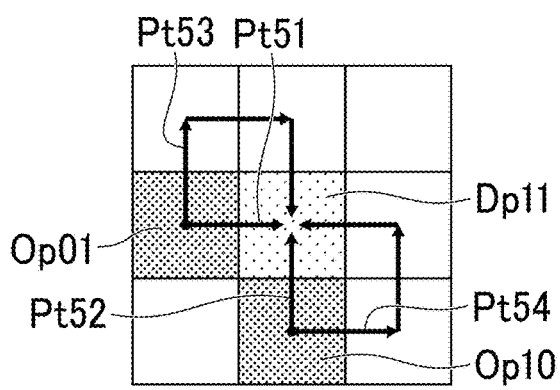
FIG. 5E is a diagram illustrating a fifth example of a path pattern according to the present embodiment.
Figure 5F:
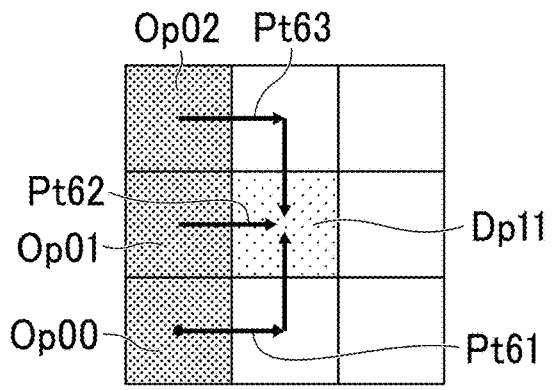
FIG. 5F is a diagram illustrating a sixth example of a path pattern according to the present embodiment.

The path pattern Pn05 illustrated as an example in FIG. 5E includes four paths Pt51 to Pt54. The paths Pt51, Pt52, Pt53, and Pt54 respectively have the phase determined pixels Op01, Op10, Op01, and Op10 serving as the origins. The path length of the paths Pt51, Pt52, Pt53, and Pt54 are 1, 1, 3, and 3, respectively. The path pattern Pn06 illustrated as an example in FIG. 5F includes three paths Pt61 to Pt63. The paths Pt61, Pt62, and Pt63 respectively have the phase determined pixel Op00, Op01, and Op02 serving as the origins. The path lengths of the paths Pt61, Pt62, and Pt63 are 2, 1, and 2, respectively.

Figure 5G:
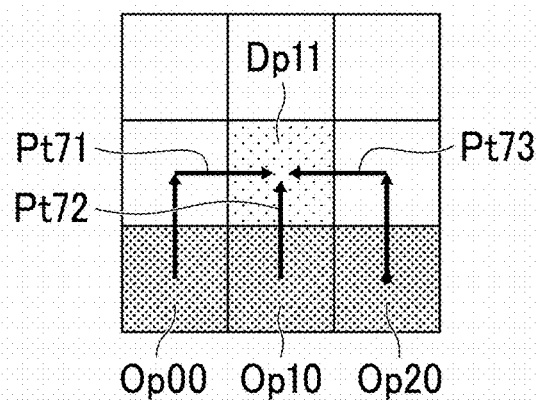
FIG. 5G is a diagram illustrating a seventh example of a path pattern according to the present embodiment.
Figure 5H:
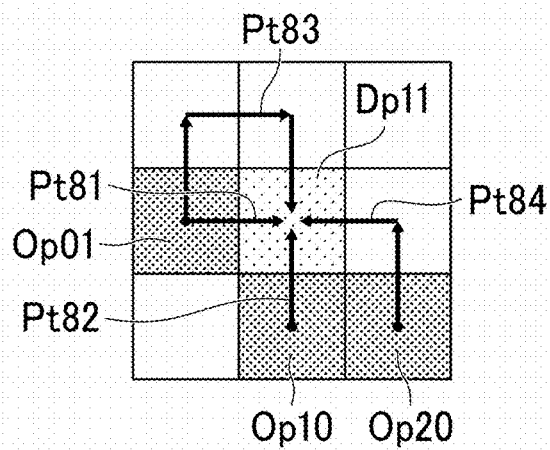
FIG. 5H is a diagram illustrating an eighth example of a path pattern according to the present embodiment.
Figure 5I:
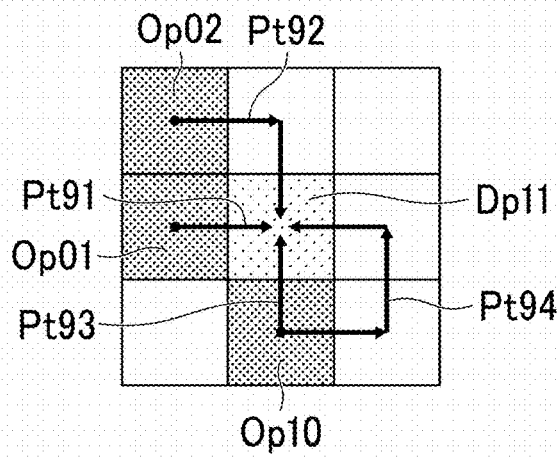
FIG. 5I is a diagram illustrating a ninth example of a path pattern according to the present embodiment.
Figure 6A:
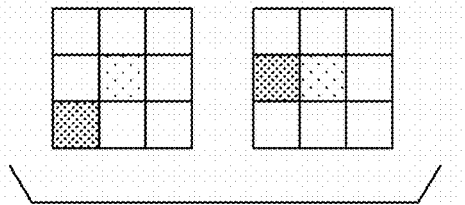
FIG. 6A is a diagram illustrating a first example of a set of an origin and a destination of the path pattern according to the present embodiment.
Figure 6B:
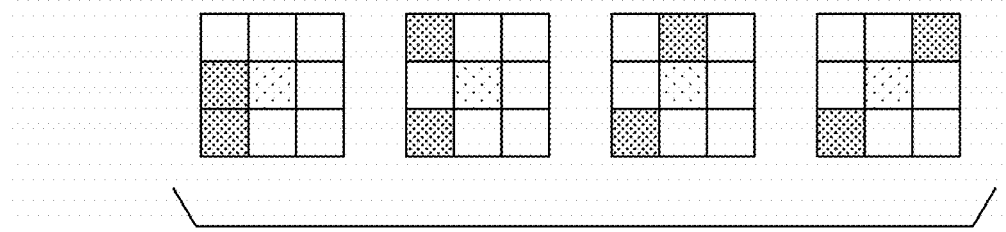
FIG. 6B is a diagram illustrating a second example of a set of an origin and a destination of the path pattern according to the present embodiment.
Figure 6C:
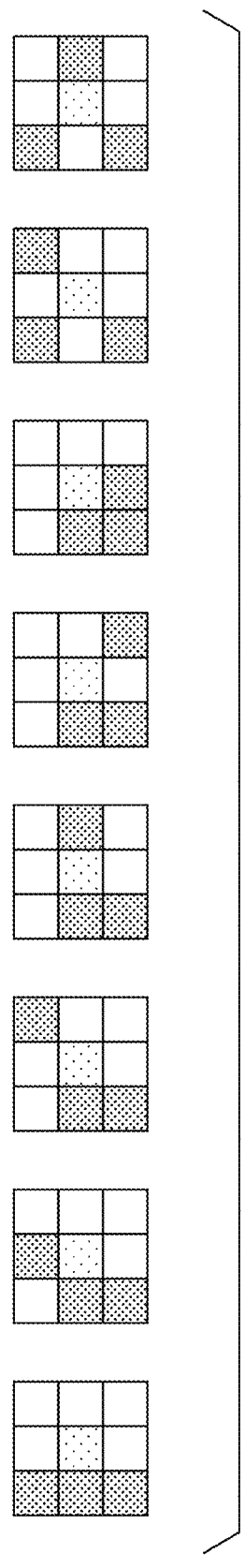
FIG. 6C is a diagram illustrating a third example of a set of an origin and a destination of the path pattern according to the present embodiment.
Figure 6D:
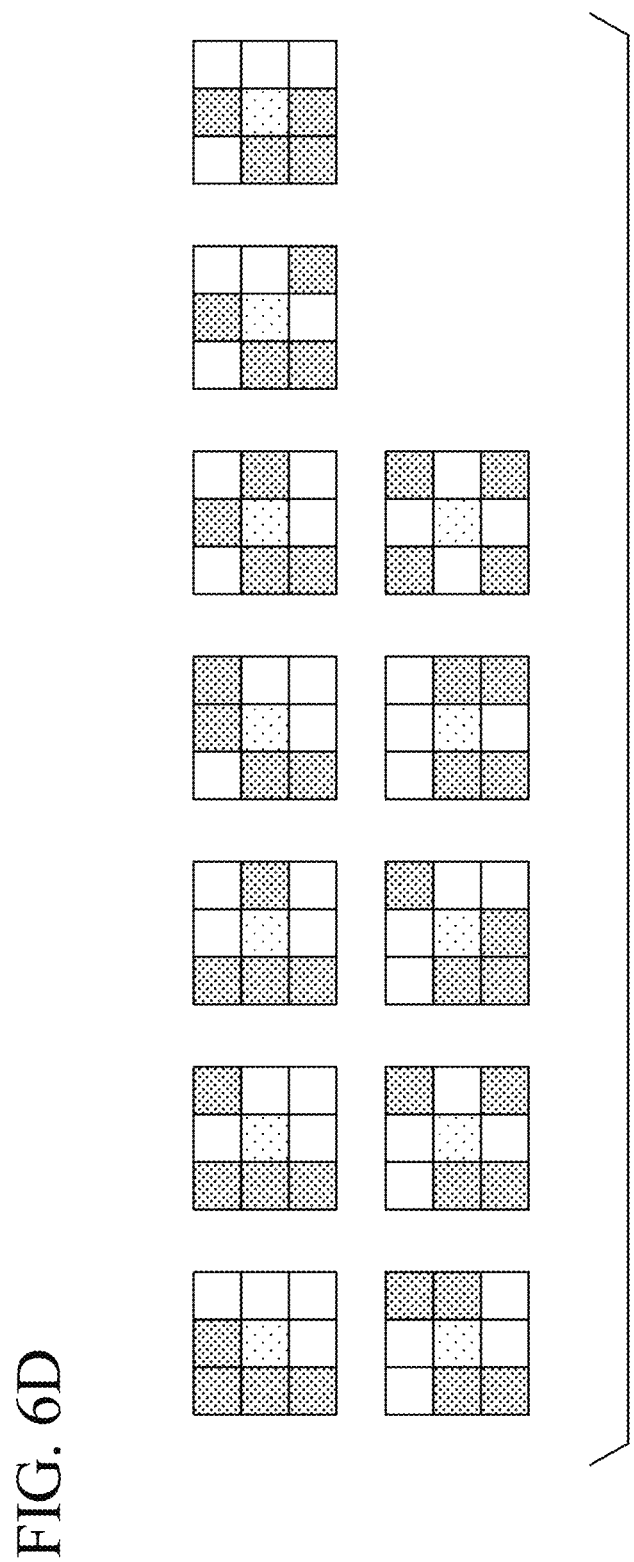
FIG. 6D is a diagram illustrating a fourth example of a set of an origin and a destination of the path pattern according to the present embodiment.

The path pattern Pn07 illustrated as an example in FIG. 5G includes three paths Pt71 to Pt73. The paths Pt71, Pt72, and Pt73 respectively have the phase determined pixels Op00, Op10, and Op20 serving as the origins. The path lengths of the paths Pt71, Pt72, and Pt73 are 2, 1, and 2, respectively. The path pattern Pn08 illustrated as an example in FIG. 5H includes fourth paths Pt81 to Pt84. The paths Pt81, Pt82, Pt83, and Pt84 respectively have the phase determined pixels Op01, Op10, Op01, and Op20 serving as the origins. The path length of the paths Pt81, Pt82, Pt83, and Pt84 are 1, 1, 3, and 2, respectively. The path pattern Pn09 illustrated as an example in FIG. 5I includes fourth paths Pt91 to Pt94. The paths Pt91, Pt92, Pt93, and Pt94 respectively have the phase determined pixels Op01, Op02, Op10, and Op10 serving as the origins. The path length of the paths Pt91, Pt92, Pt93, and Pt94 are 1, 3, 1, and 3, respectively.

FIG. 4 and FIG. 5A to FIG. 5I illustrate an example where only paths with both the x coordinate and the y coordinate of the destination not being smaller than the x coordinate and the y coordinate of the origin, respectively, are set, and the number of the origins of the path patterns Pn00 to Pn09 are one or more and three of less. However, this example should not be construed in a limiting sense. A path pattern including a path with the x coordinate of the destination being smaller than the x coordinate of the origin and with the y coordinate of the destination being smaller than the y coordinate of the origin may be set, and a path pattern with a larger number of origins may be set. FIG. 6A to FIG. 6D and FIG. 7A to FIG. 7C illustrate examples of sets of origins and a destination of a path pattern according to the present embodiment. FIG. 6A to FIG. 6D and FIG. 7A to FIG. 7C illustrate all the sets settable in a region of the x-y plane (3 samples×3 samples) with the destination being at the center. Still, a set with the distribution of the origins being symmetric with that of another set relative to the x axis or the y axis passing through the destination, and a set with the distribution of the origins being rotationally symmetric relative to that of another set about the destination, are regarded as common sets and are omitted in the figure. The origin and the destination are hatched and shaded, respectively. The paths are omitted in the figure.

Figure 7A:
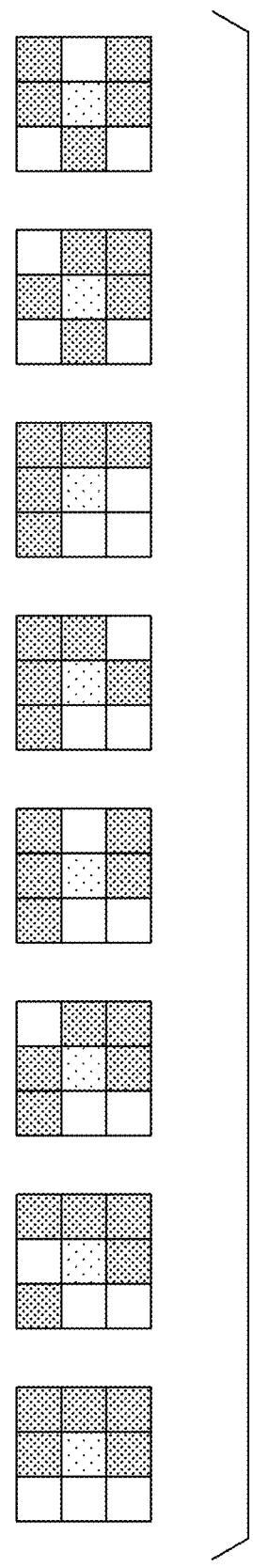
FIG. 7A is a diagram illustrating a fifth example of a set of an origin and a destination of the path pattern according to the present embodiment.
Figure 7B:
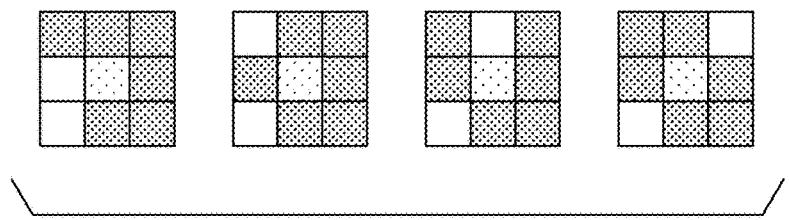
FIG. 7B is a diagram illustrating a sixth example of a set of an origin and a destination of the path pattern according to the present embodiment.
Figure 7C:
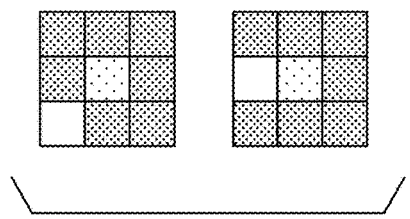
FIG. 7C is a diagram illustrating a seventh example of a set of an origin and a destination of the path pattern according to the present embodiment.

FIG. 6A to FIG. 6D illustrate sets with the numbers of origins being 1 to 4, respectively. With the numbers of origins being 1, 2, 3, and 4, sets of 2, 4, 8, and 12 patterns can be set, respectively. FIG. 7A to FIG. 7C illustrate sets with the numbers of origins being 5 to 7, respectively. With the numbers of origins being 5, 6, and 7, sets of 8, 4, and 2 patterns can be set, respectively.

Although FIG. 4 to FIG. 7C illustrate an example where the origin is a phase determined image adjacent to the destination in one of the x direction and the y direction or both (diagonal direction), this should not be construed in a limiting sense, as long as the origin is within a predetermined range from the destination. For example, the origin may be a phase determined pixel within a range of two samples from the destination. The integration path is prevented from being excessively long, by including all of the plurality of integration paths within a predetermined path setting range from the destination (FIG. 8B, FIG. 8C, and FIG. 9: path setting range Pa for example) and setting part or all of the plurality of integration paths not to fall outside the predetermined range, as can be seen in the examples illustrated in FIG. 4 and FIG. 5A to FIG. 5I.

Although FIG. 4 and FIG. 5A to FIG. 5I illustrate an example where an integration path is formed by sequentially connecting, from the origin to the destination, links each including a sample point adjacent to a certain sample point in the x direction or the y direction, this example should not be construed in a limiting sense. The origin of each link is any sample point arranged within a range of spatial resolution of the optical system, from the destination of the link. For example, the link may be a section connecting two adjacent sample points in the diagonal direction intersecting both the x direction and the y direction, or may be a section connecting two sample points that are not adjacent to each other, by skipping one or more sample points. A sample point in the middle of an integration path, that is a sample point on the integration path excluding the origin and the destination may be a sample point for which the bulk phase error has been already determined, or may be a sample point for which the bulk phase error has not been determined. However, for each position that may be the destination of a link, regarding each sample point in the two-dimensional region, the phase gradient calculation unit 140 calculates, as the phase gradient, a difference in phase of the OCT signal between the sample point as the origin of the link and the destination.

Iterative Calculation

In the bulk phase error calculation unit 150, a plurality of path patterns (for example, the path patterns Pn00 to Pn09) may be set in advance. The bulk phase error calculation unit 150 selects, for each sample point in the two-dimensional region, a path pattern, among the path patterns set in advance, satisfying the positional relationship and the correspondence relationships between the sample point as the destination and a sample point for which the bulk phase error has already been determined as the origin. The bulk phase error calculation unit 150 calculates, using each of the plurality of paths indicated by the selected path pattern being the integration path, the bulk phase error at the destination in the manner described above. Then, the bulk phase error calculation unit 150 switches the target sample point that is the bulk phase error calculation target to another sample point for which the bulk phase error has not been determined. The bulk phase error calculation unit 150 repeats the bulk phase error calculation and switching of the target sample point, until the bulk phase error is determined for all the sample points in the two-dimensional region. The target sample point corresponds to the phase determination target pixel described above.

In view of the above, using one sample point on the two-dimensional region as a reference point, an iteration for the bulk phase error calculation may be set in advance, in the bulk phase error calculation unit 150, to give a higher priority for the bulk phase error calculation on a sample point closer to the reference point. The bulk phase error calculation unit 150 may select, when a target sample point, which is a destination, being a sample point the iteration of which is m-th (m being an integer that is equal to or larger than 1) and an origin being a sample point the iteration of which is (m−1)-th, the path pattern corresponding to the positional relationship indicated by the destination and the origin. The reference point is set as a sample point the iteration of which is 0th, and the bulk phase error at the reference point is set as the predetermined reference value. The number of sample points with the same iteration is not necessarily one and may be two or more. Although, the number of sample points with the same iteration may be two or more, the iteration for the bulk phase error, between two or more sample points the iteration of which is m-th, may be predetermined order or may be determined randomly.

Figure 8A:
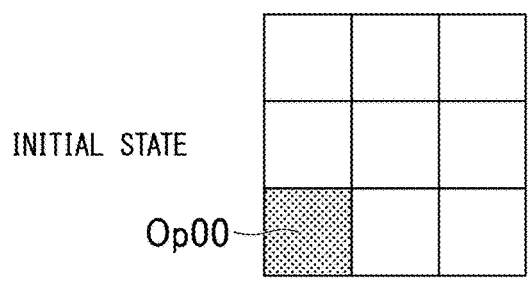
FIG. 8A is a diagram illustrating an example of an initial state of iterative bulk phase error calculation according to the present embodiment.
Figure 8B:
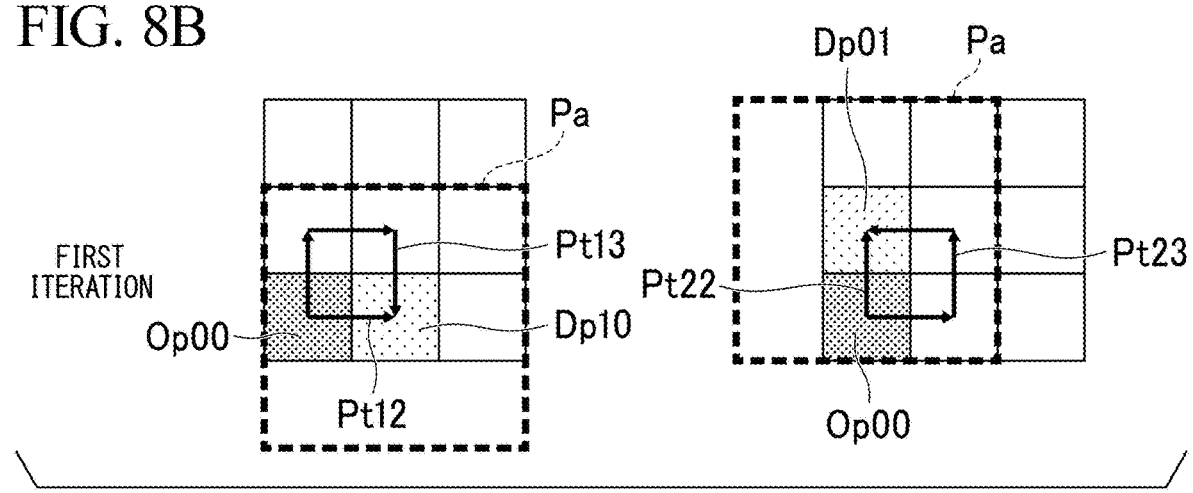
FIG. 8B is a diagram illustrating an example of the first iteration of the iterative bulk phase error calculation according to the present embodiment.

In the example illustrated in FIG. 8A to FIG. 8C and FIG. 9A, with the origin (0, 0) of the two-dimensional region as the reference point Op00, the calculation iteration is set, in the bulk phase error calculation unit 150, in order of the distance in the diagonal direction between the x direction and the y direction from the origin. The sample points with the same iteration are distributed along a line orthogonal to the diagonal direction. As illustrated in FIG. 8B, for the sample points the iteration of which is first, sample points at (1, 0) and (0, 1) are respectively set as target sample points Dp10 and Dp01. In this case, the bulk phase error calculation unit 150 can select the path patterns Pn01 and Pn02 for the target sample points Dp10 and Dp01, respectively. The selected path patterns Pn01 and Pn02 include the paths Pt11 and Pt21, respectively, that pass outside the range of the two-dimensional region in which the sample points are arranged. Thus, the bulk phase error calculation unit 150 discards these invalid paths and uses the remaining valid paths to calculate the bulk phase error. A weighting factor used for combining the path specific phase errors of the corresponding valid paths may be determined in advance based on the number of valid paths or the path lengths of the valid paths.

Figure 8C:
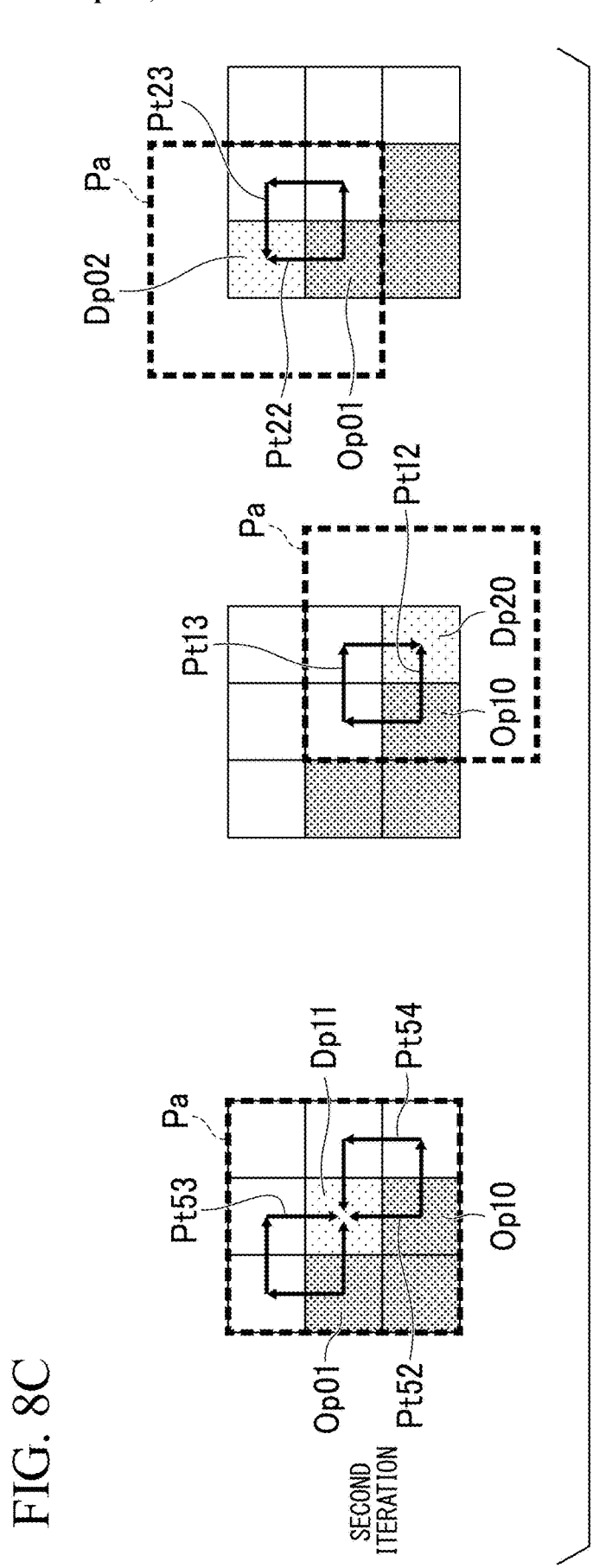
FIG. 8C is a diagram illustrating an example of the second iteration of the iterative bulk phase error calculation according to the present embodiment.
Figure 9A:
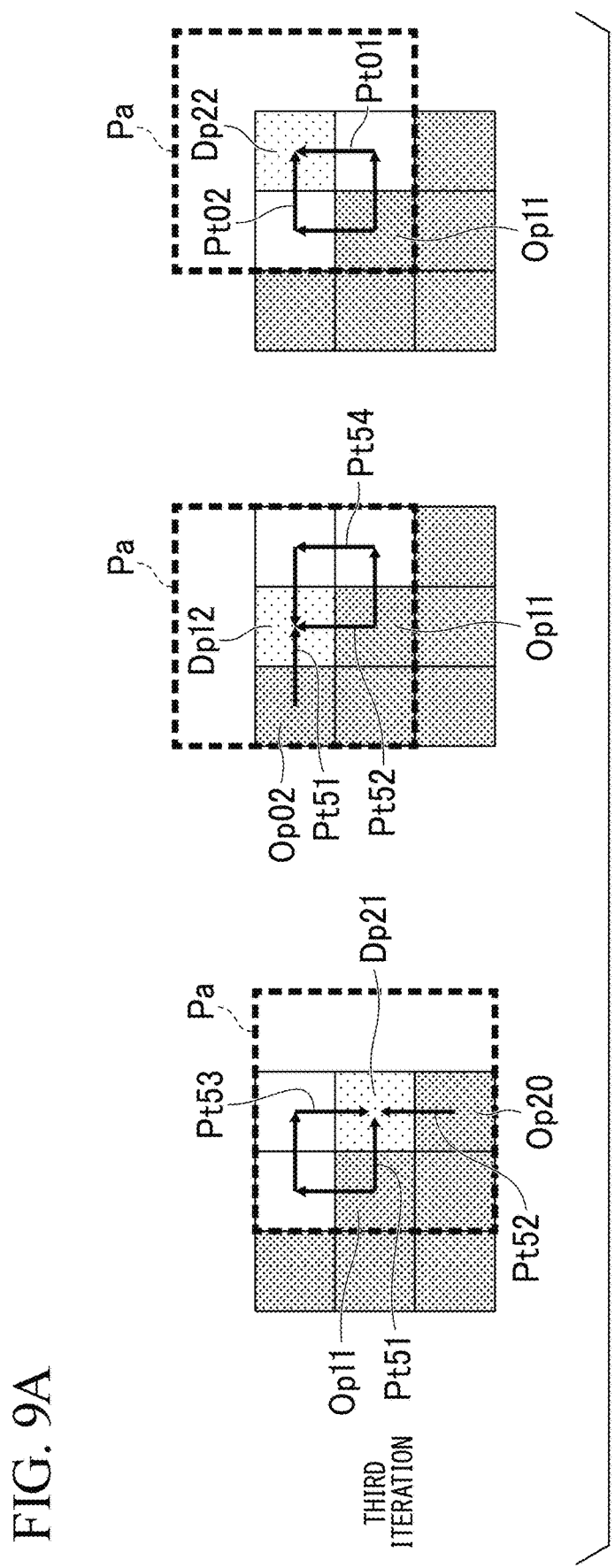
FIG. 9A is a diagram illustrating an example of the third iteration of the iterative bulk phase error calculation according to the present embodiment.

As illustrated in FIG. 8C, for the sample points the iteration of which is second, sample points at (1, 1), (2, 0), and (1, 0) are respectively set as target sample points Dp11, Dp20, and Dp02. In this case, the bulk phase error calculation unit 150 can select the path patterns Pn05, Pn01, and Pn02 for the target sample points Dp10 and Dp01, respectively. The selected path patterns Pn01 and Pn02 include the paths Pt11 and Pt21, respectively, that pass outside the range of the two-dimensional region in which the sample points are arranged. Thus, the bulk phase error calculation unit 150 discards these invalid paths and uses the remaining valid paths to calculate the bulk phase error. As illustrated in FIG. 9A, for the sample points the iteration of which is third, sample points at (2, 1) and (1, 2) are respectively set as target sample points Dp21 and Dp12. Note that in the example illustrated in FIG. 9A, the sample points the iteration of which is third include the target sample point Dp22 that is farthest from the reference point Op00 in the two-dimensional region. In this case, the bulk phase error calculation unit 150 can select the path patterns Pn05, Pn05, and Pn00 for the target sample points Dp21, DP12, and Dp22, respectively. The path patterns Pn05, Pn05, and Pn00, respectively selected for the target sample points Dp21, DP12, and Dp22, include the paths Pt54, Pt53, Pt03, and Pt04 that pass outside the range of the two-dimensional region in which the sample points are arranged. Thus, the bulk phase error calculation unit 150 discards these invalid paths and uses the remaining valid paths to calculate the bulk phase error.

The iteration among the sample points in the two-dimensional region is not limited to the example illustrated in FIG. 8A to 8C and FIG. 9A. For example, with the sample point that is the reference point as the center of the two-dimensional region, the iteration may be determined to give a higher iteration to a sample with a shorter distance to the reference point among samples around the reference point.

The bulk phase error calculation unit 150 may select, when a target sample point, which is a destination, being a sample point the iteration of which is m-th (m being an integer that is equal to or larger than 1) and an origin being a sample point the iteration of which is (m−1)-th, the path pattern corresponding to the positional relationship indicated by the destination and the origin.

Figure 9B:
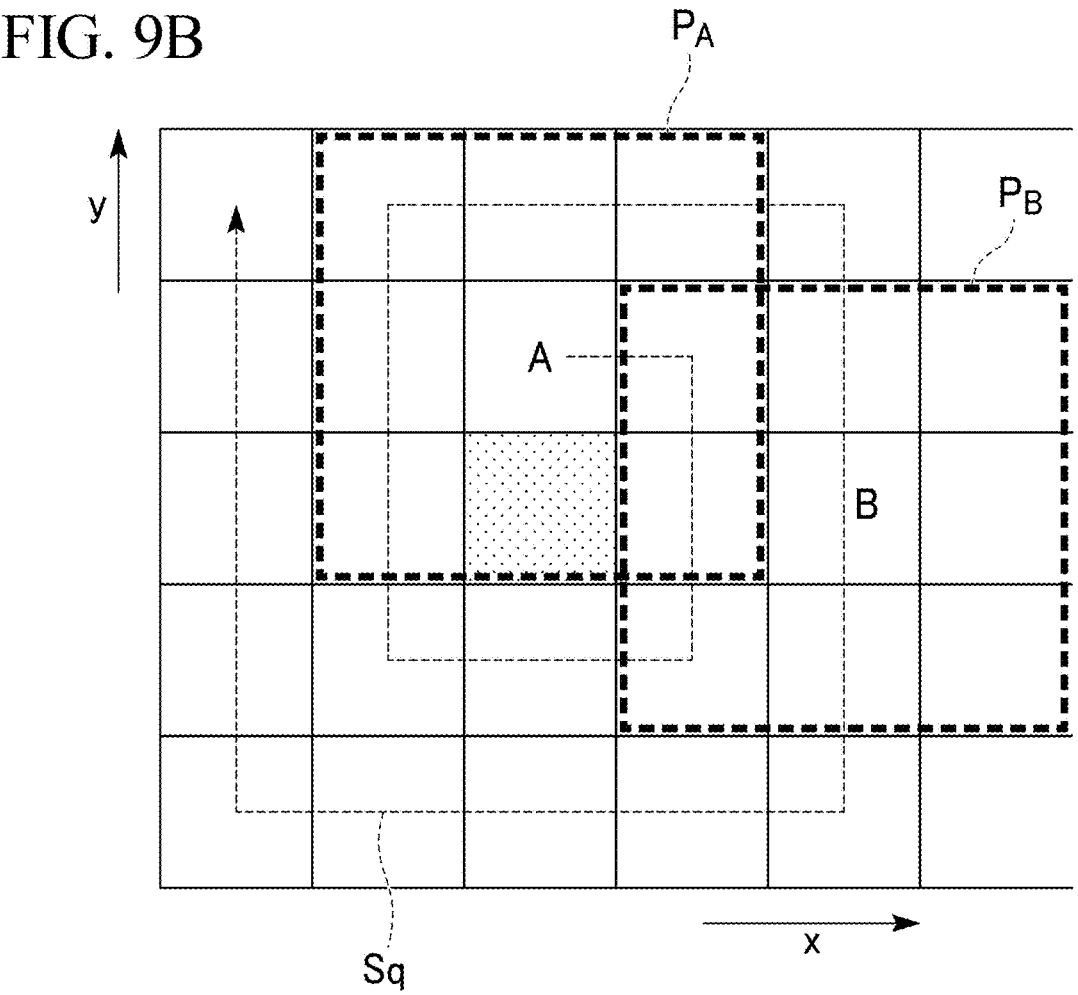
FIG. 9B is a diagram illustrating another example of the iterative bulk phase error calculation according to the present embodiment.

FIG. 9B illustrates an example of a case where the bulk phase error is calculated for a sample point A where a path Sq, which indicates the iteration, in clockwise spiral form around the reference point. In this case, the bulk phase error calculation unit 150 sets a 3 points×3 points region with the sample point A at the center as a path setting range PA. Because the reference point is the only phase determined pixel in the path setting range PA, the bulk phase error calculation unit 150 selects the path pattern illustrated as an example in FIG. 5B. When calculating the bulk phase error at the sample point B, the bulk phase error calculation unit 150 sets a 3 points×3 points region with a sample point B at the center as a path setting range $P_B$. The path setting range $P_B$ includes a total of four phase determined pixels immediately above, on the upper left side, on the left side, and on the lower left side of the sample point B. Thus, the bulk phase error calculation unit 150 selects the path pattern illustrated as an example at the left end of the first line in FIG. 6D.

In this manner, the iteration of each sample is determined to give a higher priority to a sample with a shorter distance from the reference point, and the path integration is performed with the immediately preceding iteration as the origin. Thus, the number of times the calculation is performed until the final bulk phase error calculation in the two-dimensional region is reduced. Thus, the cumulative summation of errors in the two-dimensional region as a whole is suppressed. There may be a plurality of path patterns with the destination being the target sample point and the origin being a bulk phase error determined sample point, in accordance with the positional relationship between the origin and the destination. For such a case, any one of the plurality of path patterns may be set in advance in the bulk phase error calculation unit 150, or one of the plurality of path patterns may be randomly selected.

The iteration between the sample points in the two-dimensional region is not limited to this. For example, as bulk phase error calculation processing for each line (hereinafter, line processing), the bulk phase error calculation unit 150 repeats processing of calculating the bulk phase error using the path pattern illustrated in FIG. 5A for each phase determined pixel and then switching the phase determined pixel to an adjacent sample point in the x axis direction, until the phase determined pixel reaches the sample point at the terminal end of the two-dimensional region. Thereafter, using the path pattern illustrated in FIG. 5B, the bulk phase error calculation unit 150 calculates the bulk phase error at the sample point at the starting end of the next line which is adjacent to the previous line in the y axis direction. Then, the bulk phase error calculation unit 150 may repeat the line processing until the bulk phase determination target line reaches the terminal end of the two-dimensional region.

Phase Correction Example

Figure 10A:
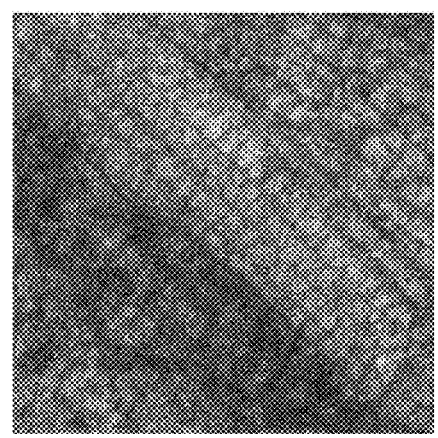
FIG. 10A is a diagram illustrating an example of an OCT image.

Next, an example of phase correction for an OCT signal based on a bulk phase error calculated will be described. FIG. 10A to FIG. 10F are diagrams illustrating examples of phase correction for an OCT signal according to the present embodiment. FIG. 10A illustrates an example of an OCT image based on an OCT signal. The OCT image illustrated in FIG. 10A illustrates a state of an observation target plane that is part of the observable region. This OCT image is based on a raw OCT signal on which the bulk phase error correction has not been performed yet. FIG. 10D illustrates a spectrum obtained by converting the OCT signal according to FIG. 10A into a spatial frequency domain. The vertical axis and the horizontal axis respectively indicate the spatial frequency in the x direction and in the y direction, with the origin being at the center. The intensity of the spectrum is expressed with shading. A brighter part indicates a higher intensity, and a darker part indicates a lower intensity. The intensity is asymmetric relative to the origin, and the center of the frequency band with the highest intensity is shifted in the x direction from the origin. A portion with a high intensity is relatively largely broadened.

Figure 10B:
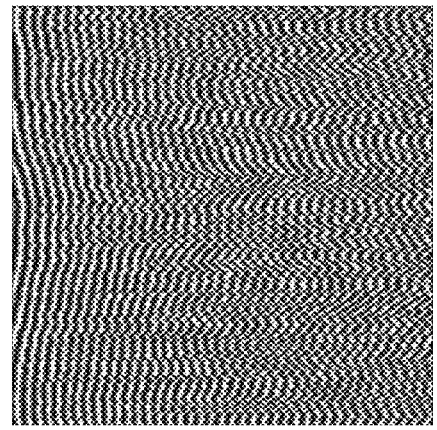
FIG. 10B is a diagram illustrating an example of a bulk phase error based on a phase-contrast method.

FIG. 10B illustrates an example of a bulk phase error calculated using a known phase-contrast method. The phase is expressed with shading. A brighter part indicates a phase closer to π, and a darker part indicates a phase closer to −π. The bulk phase error changes relatively regularly in the x direction but changes more randomly in the y direction than in the x direction.

Figure 10C:
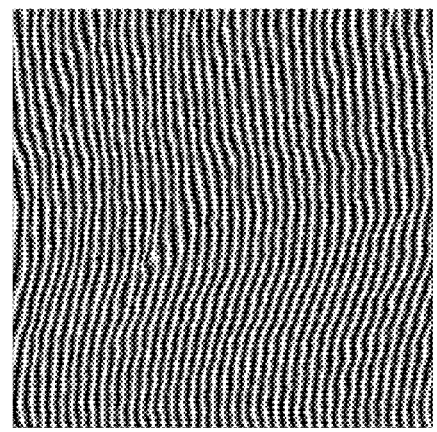
FIG. 10C is a diagram illustrating an example of a bulk phase error according to the present embodiment.
Figure 10D:
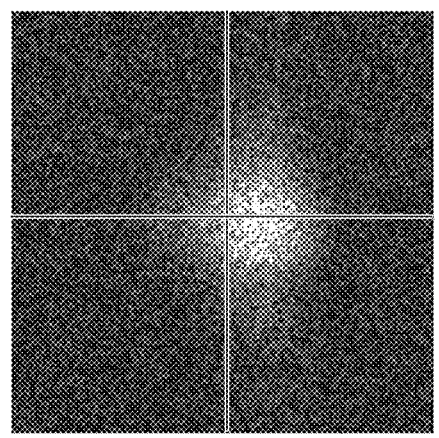
FIG. 10D is a diagram illustrating an example of a spectrum of an OCT image.
Figure 10E:
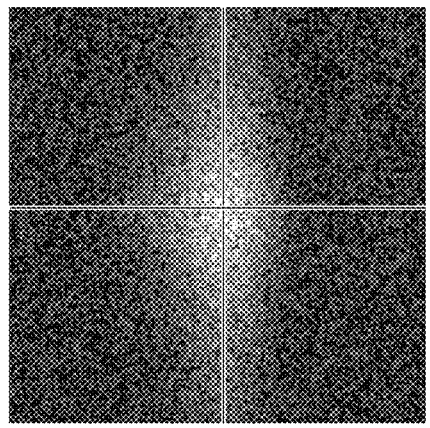
FIG. 10E is a diagram illustrating an example of a spectrum of an OCT image corrected using the bulk phase error based on the phase-contrast method.

FIG. 10E illustrates a spectrum corrected using the bulk phase error illustrated in FIG. 10B. The intensity of the spectrum in the x direction is symmetric about the y axis passing through the origin, and the broadening in the x direction is relaxed. On the other hand, the broadening of the spectrum intensity is large in the y direction. This indicates that the correction for the y direction is inappropriate.

Figure 10F:
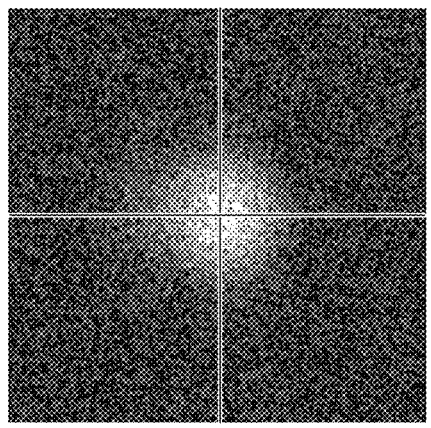
FIG. 10F is a diagram illustrating an example of a spectrum of an OCT image corrected using the bulk phase error according to the present embodiment.

FIG. 10C illustrates an example of a bulk phase error calculated by the signal processing device 100 according to the present embodiment. The phase is expressed with shading. This bulk phase error is calculated using the method described with reference to FIG. 8A to FIG. 8C and FIG. 9. The bulk phase error changes regularly in both the x direction and the y direction, to form a relatively smooth fringe pattern. FIG. 10F illustrates a spectrum of an OCT signal corrected based on the bulk phase error illustrated in FIG. 10C. The signal correction unit 160 can remove the bulk phase error included in the OCT signal by correcting the OCT signal using Equation (6). Equation (6) shows that a corrected signal value spectrum A'(x, y, z) is calculated by subtracting a bulk phase error $\varphi_b^{(t)}(x, y)$ from the phase of a spectrum A(x, y, z) of a signal value at the three-dimensional sample point (x, y, z). The intensity of the spectrum is symmetric about the origin in both the x direction and the y direction, and thus the broadening is relaxed. This indicates that the present embodiment can relax the directional dependence occurring in the phase error better than the known phase-contrast method and achieve more appropriate correction of the spectrum.

[Math. 6]

$$A'(x,y,z)=A(x,y,z)\exp(-\phi_b^{(t)}(x,y)) \quad (6)$$

Next, other examples of OCT signal correction for each sample will be described. FIGS. 11A, 11B, 11C, and 11D illustrate examples of an average of spatial frequencies $f_x$ in the x direction, an average of spatial frequencies $f_y$ in the y direction, a standard deviation of the spatial frequencies $f_x$, and a standard deviation of the spatial frequencies $f_y$, respectively, observed for four types of samples. These averages and the standard deviations are calculated for each of the original data before correction, the data after correction based on a bulk phase error calculated by simple integration, and the data after correction based on a bulk phase error calculated with a proposed method of the present embodiment. Sm01 and Sm03 indicate a case where different parts of chicken breast muscle are used as the samples. Sm02 and Sm04 indicate a case where different parts of porcine heart tissue are used as the samples. Note that Avg represents an average among Sm01 to Sm04.

Figure 11A:
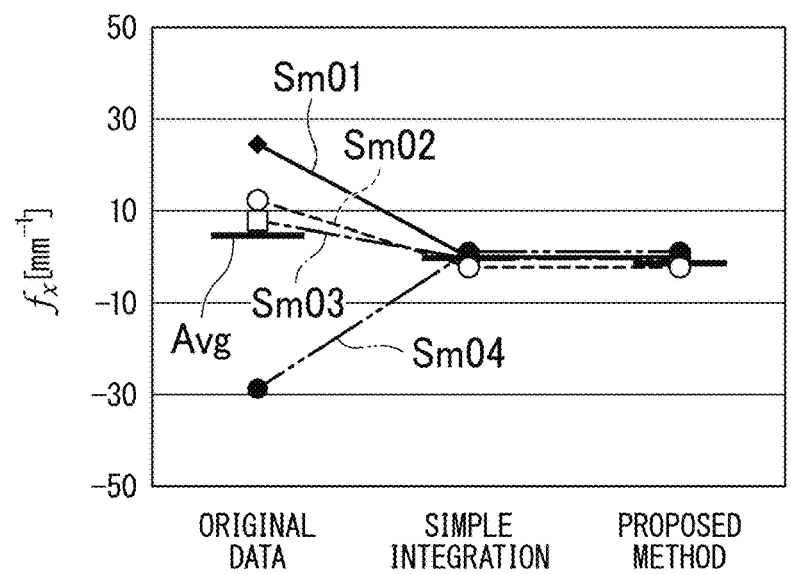
FIG. 11A is a diagram illustrating an example of an x direction average of a spatial spectrum.
Figure 11B:
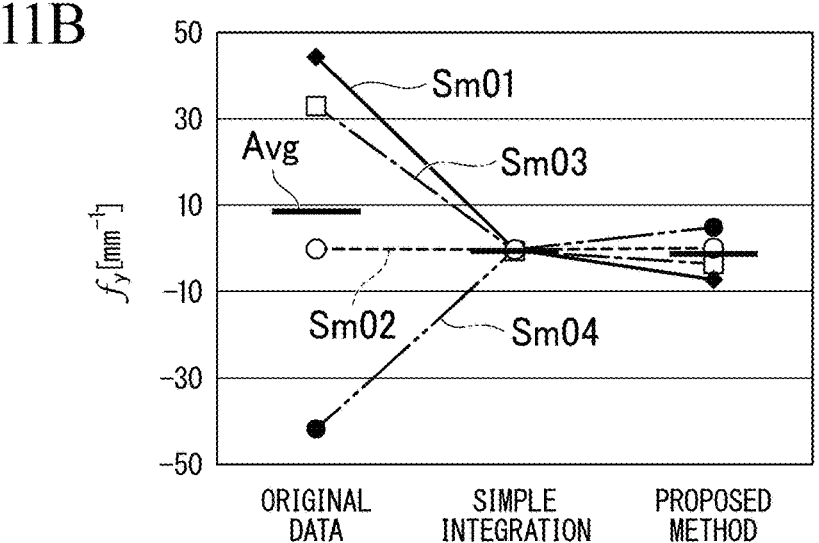
FIG. 11B is a diagram illustrating an example of a y direction average of the spatial spectrum.
Figure 11C:
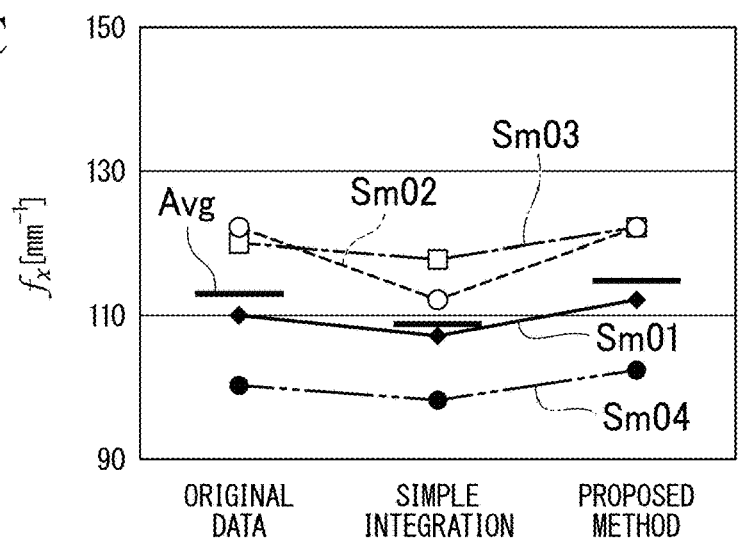
FIG. 11C is a diagram illustrating an example of an x direction standard deviation of the spatial spectrum.
Figure 11D:
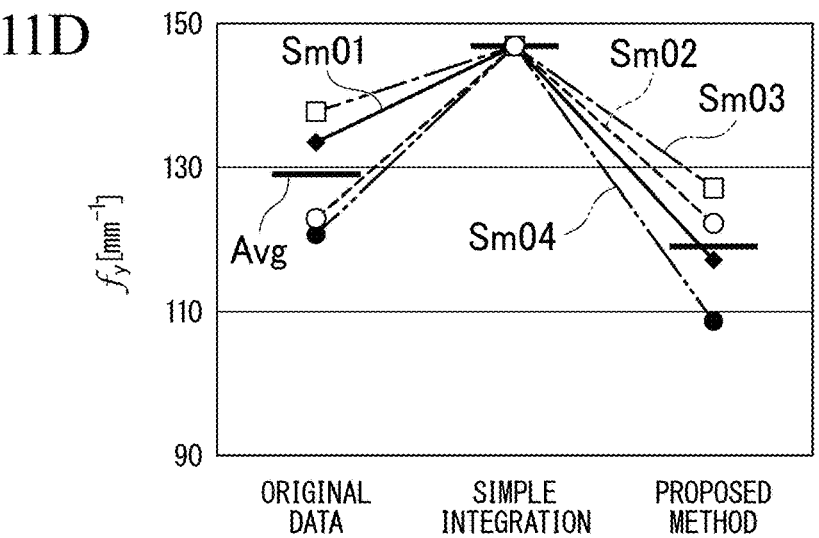
FIG. 11D is a diagram illustrating an example of a y direction standard deviation of the spatial spectrum.

As can be seen in FIG. 11A and FIG. 11B, the original data has the average largely varying among the samples. Meanwhile, with the simple integration and the proposed method, the average is substantially zeroed to be significantly reduced from the original data. Regarding the average of the spatial frequency $f_y$, the variation can be more reduced with the simple integration than with the proposed method. On the other hand, the simple integration results in a smaller standard deviation of the spatial frequency $f_x$ than that in the original data as illustrated in FIG. 11C but also results in a larger standard deviation of the spatial frequency G than that in the original data as illustrated in FIG. 11D. This indicates that the spectrum is broadened in the y direction than in the x direction. In contrast, according to the proposed method, no significant change in the standard deviations of the spatial frequency $f_x$ and the spatial frequency $f_y$ from those in the original data is observed. According to the proposed method, this indicates that the bulk phase error can be corrected without causing the spectrum bias in a certain direction.

Note that the signal correction unit 160 may perform digital refocusing on the OCT signal after correction. The signal correction unit 160 performs processing in each of the following steps for the digital refocusing. (Step S11) The signal correction unit 160 performs two-dimensional discrete Fourier transform (DFT) on the OCT signal after correction (en face OCT slice, for example) of the two-dimensional region to calculate a complex spatial frequency spectrum. (Step S12) The signal correction unit 160 multiplies a conversion coefficient of each spatial frequency ($f_x$, $f_y$) forming the complex spectrum by a phase filter $H^{-1}(f_x, f_y)$ corresponding to the spatial frequency, and thus calculates a spectrum after the filter processing including the multiplied value obtained by the multiplication. Equation (7) shows an example of the phase filter $H^{-1}(f_x, f_y)$.

[Math. 7]

$$H^{-1}(f_x, f_y) = \exp\left\{-i\pi \frac{\lambda_c z_0}{2}(f_x^2 + f_y^2)\right\} = \exp\left\{-i\pi \frac{\lambda_c z_0}{2} f_r^2\right\} \quad (7)$$

In Equation (7), $f_r$ represents the spatial frequency in the radial direction. $f_r$ is equivalent to a square-root of sum of squares of the space G in the x direction and the spatial frequency $f_y$ in the y direction. $\lambda_c$ represents the center wavelength of incident light. $z_0$ represents the amount of defocus. The amount of defocus $z_0$ usually depends on the optical system. The phase filter $H^{-1}(f_x, f_y)$ compensates for a phase shift, which is larger with a higher spatial frequency, and thus the defocusing can be reduced or eliminated. Typically, such a phase shift appears as "blur" in the OCT image. (Step S13) The signal correction unit 160 performs two-dimensional inverse discrete Fourier transform (IDFT) on the spectrum after the filter processing to generate the OCT signal after the filter processing as the refocused OCT signal. The signal correction unit 160 outputs the refocused OCT signal to the image processing unit 170. According to the image processing unit 170, a clearer OCT image can be acquired based on the OCT signal input from the signal correction unit 160.

As described above, the signal processing device 100 according to the present embodiment includes the phase gradient calculation unit 140 and the bulk phase error calculation unit 150. The phase gradient calculation unit 140 calculates a phase gradient of an OCT signal indicating a state of a sample for each of the sample points arranged on a predetermined plane (for example, two-dimensional region). The bulk phase error calculation unit 150 integrates the phase gradients of the corresponding sample points along each of the plurality of paths from an origin that is a sample point for which a bulk phase error has been determined to a destination that is a sample point for which the bulk phase error has not been determined to calculate a path specific phase errors at the destination, and combines the path specific phase errors of the plurality of corresponding paths to determine the bulk phase error at the destination. The bulk phase error calculation unit 150 calculates, for example, as a bulk phase error, an average of the path specific phase errors of the corresponding paths as the bulk phase error. According to this configuration, random error components that may differ among the paths are combined to be reduced relative to each other. Thus, non-path dependent components are estimated as the bulk phase error more accurately than in a case of simple cumulative summation of the phase gradients.

In the present embodiment, the bulk phase error calculation unit 150 may calculate, as the average of the paths, a weighted average of the path specific phase errors using a weighting factor based on a path length of each of the plurality of paths. According to this configuration, the influence of the error depending on the path length is taken into consideration, and thus the bulk phase error can be more accurately calculated. For example, with a smaller weighting factor being set to a path with a longer path length, in a case where a longer path length involves a larger influence of error, contribution of the path specific phase error of such a path can be made small. On the other hand, with a larger weighting factor being set to a path with a longer path length, in a case where a longer path length involves a smaller influence of error, contribution of the path specific phase error of the path can be made large.

In the present embodiment, each of the plurality of paths used for calculating the bulk phase error may be confined within a predetermined range from the destination. According to this configuration, the plurality of paths are each limited within a predetermined range, whereby the number of paths related to the bulk phase error calculation can be prevented from being excessively large.

In the present embodiment, each of the plurality of paths used for calculating the bulk phase error may include an n-th link that is a section from an n-th sample point to an (n+1)-th sample point (n is an integer that is equal to or larger than 1 and is equal to or smaller than N−1, and N is an integer that is equal to or larger than 2), and the (n+1)-th sample point may be a sample point within a range, from the n-th sample point, not exceeding a spatial resolution of an optical system that acquires the OCT signal. According to this configuration, each of the plurality of paths is formed by connecting one or a plurality of links formed by two sample points involving no significant difference in the signal value of the OCT signal, whereby it is possible to reduce contribution of the signal component of the OCT signal to the bulk phase error calculated.

In the present embodiment, a plurality of path patterns indicating the plurality of paths in association with positional relationship between the origin and the destination point may be set in advance in the bulk phase error calculation unit 150, and a plurality of paths indicated by path patterns satisfying the positional relationship with a target sample point, which is a calculation target of the bulk phase error, as the destination, and with a sample point for which the a bulk phase error has been determined as the origin may be selected. According to this configuration, the plurality of paths used for the bulk phase error calculation can be efficiently selected, for each target sample point in the two-dimensional region, using the relationship with the sample point for which the bulk phase error has been calculated, compared with a case where the paths are searched for each time the calculation is performed.

In the present embodiment, using one sample point on the two-dimensional plane (for example, two-dimensional region) as a reference point, an order of a calculation for the bulk phase error may be set in advance, in the bulk phase error calculation unit 150, to give a higher priority for the calculation on a sample point closer to the reference point, and when the target sample point is a sample point having the set order of an m-th order (m is an integer that is equal to or larger than 1), the plurality of paths indicated by path patterns satisfying the positional relationship with a sample point having the set order of an (m−1)-th order as the origin may be selected. According to this configuration, the influence of cumulative summation of the errors in the bulk phase errors sequentially calculated is reduced compared with a case where the iteration is randomly set. Thus, the bulk phase error can be calculated with high accuracy in the two-dimensional plane as a whole.

The signal processing device 100 according to the present embodiment may include the signal correction unit 160. The signal correction unit 160 may subtract the bulk phase error at the destination from a phase of a signal value of the OCT signal at a sample point, which is arranged in a three-dimensional space where a position projected on the plane is common to the destination. According to this configuration, the bulk phase error included in the three-dimensional OCT signal is corrected, whereby an optical coherence tomographic image with a higher quality can be obtained with shifting and broadening of the spectrum due to the bulk phase error reduced.

While an embodiment of the present invention has been described above in detail with reference to the drawings, specific configurations are not limited to those described above, and various changes to design or the like may be made within the scope that does not depart from the gist of the present invention.

For example, although an example where the signal processing device 100 is a part of the optical coherence tomography system 1 is described above, this example should not be construed in a limiting sense. The signal processing device 100 may be a stand-alone device that does not include an optical system and is independent from the optical coherence tomography system 1. In such a case, the optical system control unit 120 may be omitted in the control unit 110 of the signal processing device 100. The detection signal acquisition unit 130 may acquire the detection signal or the OCT signal from another device such as a data accumulation device or a PC through a wire or wirelessly, that is, via a network for example, meaning that device from which the signal is received is not limited the optical system.

The signal processing device 100 may include the above operation input unit and display unit, or one or both of these units may be omitted. In the control unit 110 of the signal processing device 100, the image processing unit 170 may be omitted. In such a case, the control unit 110 of the signal processing device 100 may output the corrected OCT signal generated by the signal correction unit 160 to another device such as a data accumulation device, a PC, or an image processing device. The device to be the output destination may have a function similar to that of the image processing unit 170, that is, a function of generating image data based on the corrected OCT signal input from the signal processing device 100 and displaying an OCT image based on the image data generated.

Although in the example described above, the two-dimensional region in which sample points for calculating the phase gradient or the bulk phase error is arranged to be the x-y plane, this example should not be construed in a limiting sense. Any two-dimensional plane may set, as long as three-dimensional sample points arranged in a three-dimensional space defining the observable region and two-dimensional sample points obtained by projecting the three-dimensional sample points can be associated with each other. Such a two-dimensional plane may be, for example, a y-z plane, a z-x plane, or the like. When the two-dimensional plane is the y-z plane, the three-dimensional sample point (x, y, z) is associated with a two-dimensional sample point (y, z). As the two-dimensional region, an observation target plane in which sample points corresponding to the pixels forming the OCT image are arranged may be used. The signal correction unit 160 may perform phase correction for the OCT signal based on the bulk phase error, on each observation target plane.

Note that a part of the signal processing device 100, for example, a part or all of the control unit 110, according to the embodiment described above may be implemented with a computer. In that case, this may be implemented by recording a program for implementing such a control function in a computer-readable recording medium and causing a computer system to read and execute the program recorded in the recording medium. Note that the "computer system" mentioned herein includes an OS and hardware such as peripheral equipment, which serves as a computer system incorporated in the signal processing device 100. The "computer-readable recording medium" includes a portable medium such as a flexible disk, a magneto-optical disk, a ROM, and a CD-ROM, and a storage device such as a hard disk incorporated in the computer system. In addition, the "computer-readable recording medium" may include a recording medium that dynamically stores a program for a short period of time, such as a communication wire when the program is transmitted via a network such as the Internet and a communication line such as a telephone line, and a recording medium that stores a program for a fixed period of time, such as volatile memory inside a computer system that serves as a server or a client in the above-mentioned case. Further, the program may be a program for implementing a part of the functions described above, or may be a program that can implement the above-described functions in combination with the program that is already recorded in the computer system.

A part or all of the signal processing device 100 according to the embodiment and the modification described above may be implemented as an integrated circuit such as a large scale integration (LSI) or the like. Each functional block of the signal processing device 100 may be individually implemented as a processor, or a part or all thereof may be integrated and implemented as a processor. The method for implementation as an integrated circuit is not limited to LSI, and implementation may be achieved with a dedicated circuit or a general-purpose processor. If a technology for implementation as an integrated circuit to replace LSI is developed as a result of improvement of semiconductor technology, an integrated circuit according to the technology may be used.

REFERENCE SIGNS LIST

1 Optical coherence tomography system
10 Light source
20 Beam splitter
30a, 30b, 50a, 50b Collimator
40 Reference mirror
60a, 60b Galvanometric mirror
70 Spectrometer
100 Signal processing device
120 Optical system control unit
130 Detection signal acquisition unit
140 Phase gradient calculation unit
150 Bulk phase error calculation unit
160 Signal correction unit
170 Image processing unit

The invention claimed is:

1. An optical coherence tomography (OCT) device comprising:
  a detection signal acquisition circuitry configured to acquire an OCT signal;
  a phase gradient calculation circuitry configured to calculate a phase gradient on a plane intersecting an irradiation direction of light corresponding to the OCT signal indicating a state of a sample for each of sample points arranged on the plane;
  a bulk phase error calculation circuitry configured to integrate, for each of plurality of paths from an origin that is a sample point where a bulk phase error is determined to a destination that is a sample point where the bulk phase error is not determined, the phase gradient for each of the sample points along each of the plurality of corresponding paths to calculate a path specific phase error at the destination, and
  combine the path specific phase errors among the plurality of corresponding paths to determine the bulk phase error at the destination;
  a bulk error correction circuitry configured to correct a phase of the OCT signal based on the bulk phase error to obtain a corrected OCT signal;
  an image processing circuitry configured to generate image data based on the corrected OCT signal, and output the image data to a display unit.

2. The OCT device according to claim 1,
wherein the bulk phase error calculation circuitry
is configured to calculate, as the bulk phase error, an average of the path specific phase errors among the plurality of corresponding paths.

3. The OCT device according to claim 2,
wherein the bulk phase error calculation circuitry
is configured to calculate, as the average, a weighted average of the path specific phase errors using a weighting factor based on a path length of each of the plurality of corresponding paths.

4. The OCT device according to claim 1,
wherein each of the plurality of corresponding paths is confined within a predetermined range from the destination.

5. The OCT device according to claim 1,
wherein each of the plurality of corresponding paths comprises an n-th link that is a section from an n-th sample point to an (n+1)-th sample point, n being an integer that is equal to or larger than 1 and is equal to or smaller than N−1, N being an integer that is equal to or larger than 2, and the (n+1)-th sample point is a sample point within a range, from the n-th sample point, not exceeding a spatial resolution of an optical system that acquires the optical coherence tomography signal.

6. The OCT device according to claim 1,
wherein in the bulk phase error calculation circuitry,
a plurality of path patterns indicating the plurality of paths in association with positional relationship between the origin and the destination are predetermined, and
a plurality of paths indicated by path patterns among the plurality of path patterns satisfying the positional relationship with a target sample point as the destination, the target sample point being a calculation target of the bulk phase error, are selected.

7. The OCT device according to claim 6,
wherein in the bulk phase error calculation circuitry,
using one sample point on the plane as a reference point,
an order of a calculation for the bulk phase error is preset with a higher weight for the calculation on a sample point closer to the reference point, and
for the target sample point in an m-th order, m being an integer that is equal to or larger than 1, the plurality of paths indicated by path patterns among the plurality of path patterns satisfying the positional relationship with a sample point in an (m−1)-th order as the origin are selected.

8. The OCT device according to claim 1 further comprising
a signal correction circuitry configured to subtract the bulk phase error at the destination from a phase of a signal value of the optical coherence tomography signal at a sample point, the sample point being arranged in a three-dimensional space where a position projected on the plane is common to the destination.

9. An optical coherence tomography (OCT) signal processing method in an OCT device, the method comprising:
acquiring an OCT signal;
calculating a phase gradient on a plane intersecting an irradiation direction of light corresponding to the OCT signal indicating a state of a sample for each of sample points arranged on the plane;
integrating, for each of plurality of paths from an origin that is a sample point where a bulk phase error is determined to a destination that is a sample point where the bulk phase error is not determined, the phase gradient for each of the corresponding sample points along each of the plurality of paths to calculate a path specific phase error at the destination,
combining the path specific phase errors among the plurality of corresponding paths to determine the bulk phase error at the destination;
correcting a phase of the OCT signal based on the bulk phase error to obtain a corrected OCT signal;
generating image data based on the corrected OCT signal; and
outputting the image data to a display unit.

10. A non-transitory computer readable medium storring instructions exectable by a processor in an optical coherence tomography (OCT) device, wherein execcution of the instructions causes the processor to:
acquire an OCT signal;
calculate a phase gradient on a plane intersecting an irradiation direction of light corresponding to the OCT signal indicating a state of a sample for each of sample points arranged on the plane;
integrate, for each of plurality of paths from an origin that is a sample point where a bulk phase error is determined to a destination that is a sample point where the bulk phase error is not determined, the phase gradient for each of the sample points along each of the plurality of corresponding paths a path specific phase error at the destination,
combine the path specific phase errors among the plurality of corresponding paths to determine the bulk phase error at the destination;
correct a phase of the OCT signal based on the bulk phase error to obtain a corrected OCT signal;
generate image data based on the corrected OCT signal, and
output the image data to a display unit.

* * * * *